US010385625B2

(12) United States Patent
Rutledge et al.

(10) Patent No.: US 10,385,625 B2
(45) Date of Patent: *Aug. 20, 2019

(54) SUCKER ROD APPARATUS AND METHOD

(71) Applicant: Finalrod IP, LLC, Big Spring, TX (US)

(72) Inventors: Russell P. Rutledge, Big Spring, TX (US); Russell P. Rutledge, Jr., Big Springs, TX (US); Ryan B. Rutledge, Big Springs, TX (US)

(73) Assignee: Finalrod IP, LLC, Big Spring, TX (US)

( * ) Notice: Subject to any disclaimer, the term of this patent is extended or adjusted under 35 U.S.C. 154(b) by 551 days.

This patent is subject to a terminal disclaimer.

(21) Appl. No.: 14/936,420

(22) Filed: Nov. 9, 2015

(65) Prior Publication Data

US 2016/0060969 A1 Mar. 3, 2016

Related U.S. Application Data

(63) Continuation-in-part of application No. 13/385,410, filed on Feb. 17, 2012, now Pat. No. 9,181,757, which is a continuation-in-part of application No. 13/136,715, filed on Aug. 9, 2011, now Pat. No. 8,851,162.

(51) Int. Cl.
| | |
|---|---|
| *E21B 17/04* | (2006.01) |
| *F16B 7/00* | (2006.01) |
| *E21B 43/12* | (2006.01) |
| *E21B 17/10* | (2006.01) |

(52) U.S. Cl.
CPC .......... *E21B 17/04* (2013.01); *E21B 17/1071* (2013.01); *E21B 43/127* (2013.01); *F16B 7/00* (2013.01); *Y10T 403/47* (2015.01); *Y10T 403/473* (2015.01); *Y10T 403/7039* (2015.01)

(58) Field of Classification Search
CPC ..................................................... E21B 17/04
See application file for complete search history.

(56) References Cited

U.S. PATENT DOCUMENTS

| | | | |
|---|---|---|---|
| 4,360,288 A | 11/1982 | Rutledge et al. | |
| 4,475,839 A | 10/1984 | Strandberg | |
| 4,653,953 A | 3/1987 | Anderson et al. | |
| 4,662,744 A | 5/1987 | Morrow, Jr. | |
| 4,662,774 A | 5/1987 | Morrow, Jr. | |
| RE32,865 E | 2/1989 | Rutledge, Jr. et al. | |
| 4,822,201 A | 4/1989 | Iwasaki et al. | |
| 4,919,560 A | 4/1990 | Rutlege et al. | |
| 5,253,946 A | 10/1993 | Watkins | |
| 6,193,431 B1 | 2/2001 | Rutlege et al. | |
| 6,886,484 B2 | 5/2005 | Thomas | |

(Continued)

*Primary Examiner* — Giovanna C Wright

(57) ABSTRACT

Sucker rods include end fittings having an outer wedge portion proximate to an open end, an inner wedge portion proximate to a closed end, and an intermediate wedge portion between the outer and inner wedges. Each wedge includes a leading edge, a trailing edge, and an angle between the leading and trailing edges. The triangular configuration, length of the leading edge, the length of the trailing edge, and size of the angle in each wedge portion cause distribution of force, such that compressive forces distributed to the rod proximate the closed end exceed compressive forces distributed to the rod proximate the open end.

15 Claims, 14 Drawing Sheets

(56) References Cited

U.S. PATENT DOCUMENTS

| | | | |
|---|---|---|---|
| 7,730,938 B2 | 6/2010 | Rutlege et al. | |
| 7,972,463 B2 | 7/2011 | Rutlege et al. | |
| 8,062,463 B2 | 11/2011 | Rutlege et al. | |
| 8,113,277 B2 | 2/2012 | Rutlege et al. | |
| 8,500,943 B2 | 8/2013 | Rutlege et al. | |
| 8,851,162 B2 * | 10/2014 | Rutledge | F04B 47/02 166/105 |
| 9,045,951 B2 * | 6/2015 | Rutledge | E21B 43/127 |
| 9,181,757 B2 * | 11/2015 | Rutledge | E21B 43/127 |
| 2008/0219757 A1 | 9/2008 | Rutledge et al. | |

* cited by examiner

SUCKER ROD APPARATUS AND METHOD

CROSS-REFERENCE TO RELATED APPLICATIONS

The present application is a continuation-in-part application, claiming priority to the United States application for patent having the Ser. No. 13/385,410, filed Feb. 17, 2012, which is a continuation-in-part application, claiming priority to the United States application for patent having the Ser. No. 13/136,715, filed Aug. 9, 2011, both of which are incorporated by reference herein in their entirety.

FIELD

Embodiments usable within the scope of the present disclosure relate, generally, to secondary recovery systems and methods for use with hydrocarbon and other types of wells, and more specifically, to connectors (e.g., end fittings) and methods usable with strings of sucker rods made from fiberglass.

BACKGROUND

When production from a hydrocarbon well attainable through natural means (e.g., pressure within the wellbore) is no longer sufficient for the well to remain economically viable, numerous types of secondary recovery methods exist to increase the productivity of the well. One such method includes use of a downhole pump that is inserted into the wellbore, then actuated to draw hydrocarbons and/or other fluids toward the surface. Conventionally, downhole pumps are actuated by physically manipulating values and/or other operable parts from the surface, through movement of a pump jack or similar powered device, that is connected to the downhole pump using a long string of joined connectors, termed "sucker rods."

Conventional sucker rod strings are formed from lengths of steel rod, having threaded connectors at each end for engaging adjacent segments of rod, to form a string of sufficient length to connect a pump jack to a down hole pump. Because steel is heavy, expensive, and suffers from other inherent difficulties, alternative types of sucker rod materials have been explored, such as fiberglass. Fiberglass offers an equivalent or greater tensile strength than steel, while being both lighter and less costly, enabling a string of fiberglass sucker rods to be reciprocated using less energy and smaller equipment. Fiberglass rods also possess the ability to stretch in an axial direction, such that each stroke of a pump jack can be assisted by the natural expansion and contraction of the sucker rod string, allowing for shorter and more energy efficient strokes.

The ends of fiberglass rod segments used in a sucker rod string can be connected by use of threaded end connectors or end fittings, typically made from steel. An epoxy or other suitable resin can be introduced into the end fitting for bonding to and between the exterior of the fiberglass rod segment and interior of the end fitting. By providing epoxy or other resin into the interior of an end fitting, the epoxy or other resin when cured bonds to the fiberglass rod segment, while filling the interior cavity of the end fitting. The cured epoxy or other resin ("resin material") prevents removal or displacement of the rod from the end fitting during use.

SUMMARY

Embodiments according to this disclosure address problems encountered when manufacturing and using fiberglass or similar fiber composite rod segments ("rod segment") engaged with end connectors ("end fittings") in sucker rod strings, including, but not limited to, aspects regarding the manner of distribution of forces that result from the reciprocation and pumping operation. An aspect of this disclosure is the observation that, as the sucker rod string is reciprocated, tensile forces or pulling forces, compression forces, or other forces ("forces") exerted during use between each rod segment, the engaged end fittings, and the resin material contribute to migration of protruding sections of resin material toward narrower portions of the interior of the end fittings, exerting compressive force on the rod segment at what can be characterized as a single point or location along the rod segment. As used here, "point" means a location, portion or peripheral area of the rod segment indicated by reference to the longitudinal axis of the rod or end fitting. Compressive forces in excess of the tolerance of the rod segment at any point can cause the rod to break, severing the sucker rod string and requiring time-consuming and expensive remedial operations (e.g., fishing) to retrieve the severed string and the downhole pump. This severing (e.g., "pinching") of a rod segment normally occurs at or near the point at which the rod segment meets the end fitting.

According to embodiments of this disclosure, the specific shape, configuration and geometry of the interior of end fittings, corresponding shape, configuration and geometry of the cured epoxy or similar resin ("resin material"), and relationship and interactions between the end fitting and resin material, and between the resin material and rod segment, are selected and configured to limit the amount of compressive force applied to the rod segment at any single point or location, e.g., by receiving and/or distributing compressive forces at multiple points along the length of the rod segment. The internal features necessary to prevent destruction of the sucker rod string during use limit the dimensions, materials, and manufacturing techniques usable to form suitable end fittings and assemblies of end fittings with rod segments ("sucker rod assemblies"). An aspect of this disclosure is that embodiments provide sucker rod strings, end fittings, and sucker rod assemblies having improved load capacity and durability, reduced weight and improved strength characteristics, and complying with the afore-mentioned limitations on internal features, dimensions, materials and manufacturing techniques.

Need exists for end fittings, sucker rods, sucker rod assemblies, systems, sucker rod strings and methods that provide improved capability to withstand and compensate for the forces applied to a sucker rod string during reciprocation thereof in a variety of ways, with improved durability over long periods of service, and improved strength and weight characteristics to enable reduced energy consumption, using multiple combinations of structural features. An aspect of this disclosure is that embodiments provide methods for production of petroleum from wells, by pumping, which are of improved energy efficiency, energy consumption, reliability and durability. Embodiments usable within the scope of the present disclosure meet the above-referenced and other needs.

Embodiments usable within the scope of the present disclosure include sucker rod assemblies having end fittings, resin material and rod segments (e.g., fiberglass and/or fiber composite rods) assembled in permanent relationship. The end fitting includes a body having an interior, a closed end, an open end, and a cavity defined by the interior. A wedge system is formed in the interior. In one embodiment, the wedge system includes an outer wedge portion ("outer wedge portion") formed in the interior proximate the open end, an inner wedge-shaped portion ("inner wedge portion") formed in the interior proximate the close end, and an intermediate wedge-shaped portion ("intermediate wedge portion") formed in the interior between the outer wedge and inner wedge. The outer wedge portion has a first leading edge, a first trailing edge, and a first angle between the first leading and trailing edges. The length of the first leading edge, the length of the first trailing edge, and the size of the first angle define a first distribution of force in the outer wedge portion. The intermediate wedge portion has a second leading edge, a second trailing edge, and a second angle between the second leading edge and the second trailing edge. The length of the second leading edge, the length of the second trailing edge, and the size of the second angle define a second distribution of force in the intermediate wedge portion. The inner wedge portion has a third leading edge, a third trailing edge, and a third angle between the third leading edge and the third trailing edge. The length of the third leading edge, the length of the third trailing edge, and the size of the third angle define a third distribution of force in the inner wedge portion.

In embodiments, the first leading edge, second leading edge, and third leading edge each differ in length, such that during use and reciprocation of the sucker rod assembly forces are distributed by the outer wedge portion, intermediate wedge portion and inner wedge portion so that a compressive load applied to the inner wedge portion is greater than a compressive load applied to the intermediate wedge portion, and the compressive load applied to the intermediate wedge portion is greater than a compressive load applied to the outer wedge portion, and also such that compressive forces distributed to the rod segment at the closed end of the body exceed those distributed to the rod segment at the open end of the body. One of skill will understand that the outer wedge portion, intermediate wedge portion and inner wedge portion can be considered in combination as defining a "force distribution profile" of the end fitting with respect to the resin material and, ultimately, with respect to the rod segment installed therein. According to embodiments, the lengths of the respective leading edges of the outer, intermediate and inner wedge portions can, of themselves, provide the end fitting with a force distribution profile in which the compressive load at the outer wedge portion exceeds that at the intermediate wedge portion, and in which compressive load at the intermediate wedge portion exceeds that at the inner wedge portion. In various embodiments, the leading edges can be sized and/or arranged in a configuration that, considered alone, does not provide such a force distribution, and the trailing edges and/or the sizes of the angles can be sized and/or arranged in respective configurations in each of the outer, intermediate and inner wedge portion to provide or contribute to the desired force distribution profile of the end fitting.

As such, in an embodiment, the first, second, and third angles can differ in size, such that the compressive load applied to the inner wedge portion is greater than the compressive load applied to the intermediate wedge portion, and the compressive load applied to the intermediate wedge portion is greater than the compressive load applied to the outer wedge portion, to enable compressive forces at the closed end of the body to exceed those at the open end of the body. While the sizes of the angles can, themselves, provide the end fitting with a force distribution in which the compressive load at the outer wedge portion exceeds that at the inner wedge portion, in various embodiments, the angles can be sized and/or arranged in a manner that may not necessary provide such a force distribution, while the lengths and arrangement of the leading and/or trailing edges could provide this force distribution.

In an embodiment, the lengths of the first, second, and third trailing edges can differ, such that the compressive load applied to the inner wedge portion is greater than the compressive load applied to the intermediate wedge portion, and the compressive load applied to the intermediate wedge portion is greater than the compressive load applied to the outer wedge portion, to enable compressive forces at the closed end of the body to exceed those at the open end of the body. While the lengths of the trailing edges can, themselves, provide the end fitting with a force distribution in which the compressive load at the outer wedge portion exceeds that at the inner wedge portion, in various embodiments, the trailing edges can be sized and/or arranged in a manner that may not necessary provide such a force distribution, while the lengths and arrangement of the leading edges and/or the sizes of the angles in each wedge portion could provide this force distribution.

As such, each wedge portion has a force distribution determined by the combination of the respective leading edge length, trailing edge length, and angle size of that wedge portion, and any combination of leading edge lengths, trailing edge lengths, or angles can be selected, to provide the end fitting with desired dimensions, material characteristics, and the desired distribution of forces.

Embodiments usable within the scope of the present disclosure include end fittings having a body with an interior, a closed end, and an open end, with a first wedge portion formed in the interior and a second wedge portion formed in the interior between the first wedge portion and the closed end. The first wedge portion includes a first leading edge, a first trailing edge, and a first angle between the first leading edge and the first trailing edge. The length of the first leading edge, the length of the first trailing edge, and the size of the first angle define a first distribution of force in the first wedge portion. The second wedge portion includes a second leading edge, a second trailing edge, and a second angle between the second leading edge and the second trailing edge. The length of the second leading edge, the length of the second trailing edge, and the size of the second angle define a second distribution of force in the second wedge portion. The first distribution of force and the second distribution of force vary such that a compressive load applied to the second wedge portion is greater than a compressive load applied to the first wedge portion, and compressive forces at the closed end of the body exceed compressive forces at the open end of the body.

In an embodiment, such a distribution of forces can be achieved through providing the first leading edge and the second leading edge with differing lengths. In such an embodiment, the length of the first and second trailing edges can be equal and the sizes of the first and second angles can be equal. Alternatively, the trailing edges could differ in length, the angles could differ in size, or combinations thereof.

In an embodiment, the distribution of forces can be achieved through providing the first trailing edge and the second trailing edge with differing lengths. In such an embodiment, the length of the first and second leading edges could be equal and the sizes of the first and second angles can be equal. Alternatively, the leading edges could differ in length, the angles could differ in size, or combinations thereof. In a further embodiment, the ratio of the length of the leading edge to that of the trailing edge, for each respective wedge portion, can determine the amount of compressive force received by that wedge portion.

In an embodiment, the distribution of forces can be achieved through providing the first angle and the second angle with differing sizes. In such an embodiment, the length of the first and second leading edges can be equal and the length of the first and second trailing edges can be equal. Alternatively, the leading edges can be of different lengths, the trailing edges can be of different lengths, or combinations thereof.

Embodiments usable within the scope of the present disclosure include end fittings having a body with an interior, and a wedge system formed in the interior. The wedge system can include an outer wedge portion formed in the interior proximate to the open end, an intermediate wedge portion formed in the interior between the outer wedge portion and the closed end, and an inner wedge portion formed in the interior between the intermediate wedge portion and the closed end, proximate to the closed end. The outer wedge portion includes a first leading edge, a first trailing edge, and a first angle between the first leading and trailing edges. The length of the first leading and trailing edges and the size of the first angle define a distribution of force in the outer wedge portion. The intermediate wedge portion includes a second leading edge, a second trailing edge, and a second angle between the second leading and trailing edges. The length of the second leading and trailing edges and the size of the second angle define a distribution of force in the intermediate wedge portion. The inner wedge portion includes a third leading edge, a third trailing edge, and a third angle between the third leading and trailing edges. The length of the third leading and trailing edges and the size of the third angle define a distribution of force in the inner wedge portion.

The distribution of force in each wedge portion varies, such that the compressive load applied to the inner wedge portion is greater than the compressive load applied to the intermediate wedge portion, and the compressive load applied to the intermediate wedge portion is greater than the compressive load applied to the outer wedge portion, enabling compressive forces at the closed end of the body exceed compressive forces at the open end of the body.

As described above, any of the leading edges or trailing edges could vary in length, and the angles between the edges could vary in size, depending on the desired dimensions, structural characteristics, and force distribution in the end fitting. For example, the first leading edge can be longer than the second leading edge, which can be longer than the third; the first and second leading edges could be equal in length while the third is shorter, or longer; the third leading edge can be longer than the second leading edge, which can be longer than the first; the second and third leading edges can be generally equal in length, while the first is shorter, or longer; all three leading edges could be equal in length; the first leading edge can be longer than the third, which is longer than the second; the third leading edge can be longer than the first, which is longer than the second; the third leading edge can be shorter than the first, which is shorter than the second; the first leading edge can be shorter than the third, which is shorter than the second; or the first and third leading edges can be equal in length, while the second is shorter, or longer.

In a similar manner, any of the above configurations could be present with regard to the length of the trailing edges and/or the size of the angles between the leading and trailing edges.

BRIEF DESCRIPTION OF THE DRAWINGS

The accompanying drawings, which are incorporated in and constitute a part of the specification, illustrate preferred embodiments of the disclosure and together with the general description of the disclosure and the detailed description of the preferred embodiments given below, serve to explain the principles of the disclosure.

The depicted embodiments of sucker rods, sucker rod assemblies, end fittings for sucker rods, production wells, methods and subject matter are described below with reference to the listed Figures.

The above general description and the following detailed description are merely illustrative of the generic disclosure, and additional modes, advantages, and particulars of this disclosure will be readily suggested to those skilled in the art without departing from the spirit and scope of the disclosure.

DETAILED DESCRIPTION OF THE EMBODIMENTS

Figure 1:
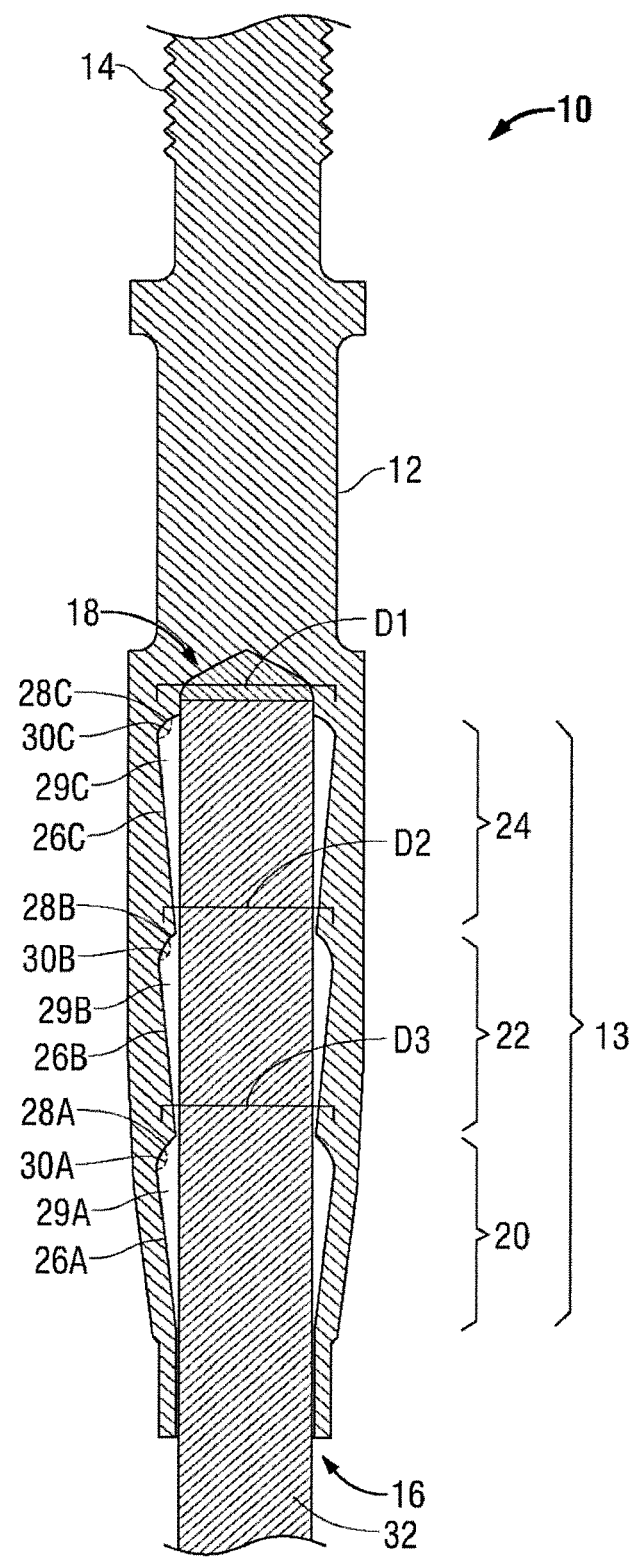
FIG. 1 depicts a cross-sectional view of an embodiment of an end fitting usable within the scope of the present disclosure engaged with a segment of a sucker rod.

FIG. 1 depicts a diagrammatic cross sectional view of an embodiment of an end fitting (10) usable within the scope of the present disclosure, having an end of a segment of a sucker rod (32) engaged therein. It should be understood that the embodiment shown in FIG. 1 is merely an illustrative, diagrammatic view of one possible configuration and arrangement of components, and, as described above, the specific dimensions and arrangement of portions of the end fitting (10), most notably the configuration of the wedge system depicted in the interior thereof, can be varied without departing from the scope of the present disclosure.

The end fitting (10) has a body (12) (e.g., a generally tubular, cylindrical body), with threads (14) at one end thereof for engaging an adjacent object (e.g., a connector engaged with a subsequent section of a sucker rod string). The depicted end fitting (10) includes an open end (16), through which the sucker rod segment (32) can be engaged, and a closed end (18) opposite the open end (16). Body (12) between the closed end (18) and open end (16) is generally hollow, having an interior surface defining a cavity for receiving the sucker rod segment (32). The interior of body (12) includes a wedge system (13). Wedge system (13) includes an outer wedge (20), an intermediate wedge (22), and an inner wedge (24). It will be understood that a suitable securing material ("resin material"), such as a suitable cured epoxy or other resin, is present in the cavity between sucker rod segment (32) and the interior surface of end fitting (10) and fixedly secures the sucker rod segment (32) in end fitting (10).

Each of the outer wedge (20), intermediate wedge (22), and inner wedge (24) viewed in cross-section has a respective triangular configuration and includes, generally, a leading edge positioned closer to the open end (16), a trailing edge positioned closer to the closed end (18), and an angle between the leading and trailing edges. Specifically, the outer wedge (20) is shown having a first leading edge (26A), a first trailing edge (28A), and a first angle (30A); the intermediate wedge (22) is shown having a second leading edge (26B), a second trailing edge (28B), and a second angle (30B); and the inner wedge (24) is shown having a third leading edge (26C), a third trailing edge (28C), and a third angle (30C). In an embodiment, one or more of the angles can be obtuse. As used herein, "obtuse" means an angle between 90 degrees and 180 degrees.

During use, the sucker rod segment (32) can be secured within the end fitting (10) by providing resin material (e.g., epoxy, resin, etc.) into the interior thereof. In addition to bonding to the sucker rod segment (32), the adhesive/epoxy/resin fills respective portions of the cavity at each of the wedge regions (20, 22, 24), thus forming respective protruding wedge sections ("protruding wedges" 29A, 29B, 29C) of resin material that extend from the sucker rod segment (32). As the sucker rod is reciprocated in a wellbore, the sucker rod segment (32) will alternatingly experience an axial, tensile force in the direction of the open end (16) (e.g., tending to pull the sucker rod segment (32) from the end fitting (10)), and an axial compressive force in the direction of the closed end (18) (e.g., tending to push the sucker rod segment (32) against the closed end (18)).

When subjected to a force in the direction of the open end (16), contact between the protruding wedges (29A, 29B, 29C) of resin material extending from the sucker rod segment (32) and the leading edges (26C, 26B, 26A) will distribute compressive force to the sucker rod segment (32) at each of the respective wedge portions (24, 22, 20). When subjected to a force in the direction of the closed end (18), contact between the protruding wedges (29A, 29B, 29C) of resin material extending from the sucker rod segment (32) and the trailing edges (28C, 28B, 28A) will distribute compressive force to the sucker rod segment (32) at each of the respective wedge portions (24, 22, 20). The amount of each compressive force applied to each respective wedge portion (20, 22, 24) can vary depending on the length of the leading edge (26A, 26B, 26C), or trailing edge (28A, 28B, 28C) against which the protruding wedge of cured epoxy/resin material is urged by the axial force from reciprocation of the sucker rod string. The size of the angles (30A, 30B, 30C) influences the angle at which each of the edges (26A, 28A, 26B, 28B, 26C, 28C) extends relative to the corresponding protruding wedge (29A, 29B, 29C) of resin material and therefore also influences the force applied to each wedge portion (20, 22, 24).

Figure 2:
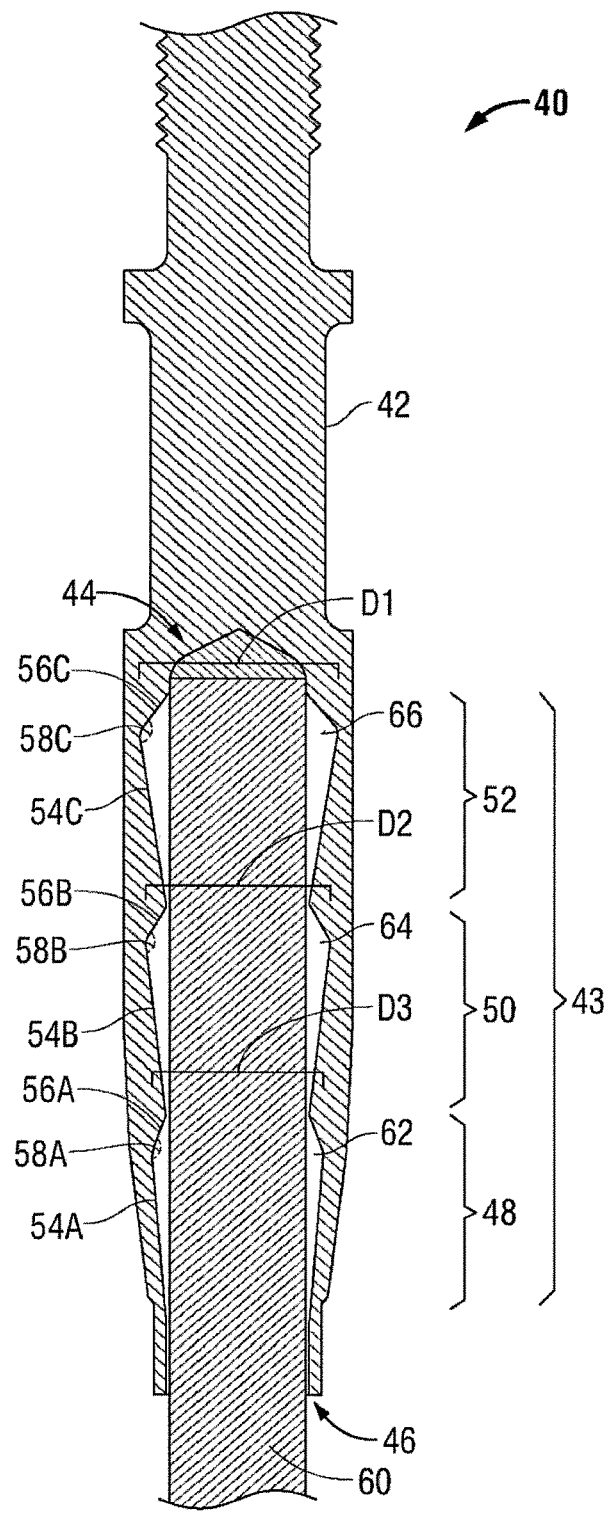
FIG. 2 depicts a diagrammatic side, cross-sectional view of an embodiment of an end fitting usable within the scope of the present disclosure engaged with a segment of a sucker rod.

FIG. 2 depicts a diagrammatic cross sectional view of an embodiment of an end fitting (40) usable within the scope of the present disclosure, having an end of a segment of a sucker rod (60) engaged therein. It should be understood that the embodiment shown in FIG. 2 is illustrative one possible configuration and arrangement of components, as described above. End fitting (40) is identical to end fitting (10) illustrated in FIG. 1, except as otherwise described here or illustrated in FIG. 2. The end fitting (40) is shown having a body (42) (e.g., a generally tubular, cylindrical body). The body (42) can include threads (not shown) or similar means for engagement with adjacent objects (e.g., end fittings secured to subsequent sections of a sucker rod string) at a closed end (44) thereof, while the sucker rod segment (60) can be inserted into and engaged through the open end (46) of the body (42). The portion of the body (42) between the closed and open ends (44, 46) is shown having a bore therein, defining an interior for engagement with the sucker rod segment (60). The interior is depicted having a wedge system, in which the depicted embodiment includes an outer wedge (48), an intermediate wedge (50), and an inner wedge (52).

Each of the wedges (48, 50, 52) includes, generally, a leading edge positioned closer to the open end (46), a trailing edge positioned closer to the closed end (44), and an angle between the leading and trailing edges. Specifically, the outer wedge (48) is shown having a first leading edge (54A), a first trailing edge (56A), and a first angle (58A); the intermediate wedge (50) is shown having a second leading edge (54B), a second trailing edge (56B), and a second angle (58B); and the inner wedge (52) is shown having a third leading edge (54C), a third trailing edge (56C), and a third angle (58C). In an embodiment, one or more of the angles can be obtuse.

In the depicted embodiment, the third angle (58C) in the inner wedge (52) is smaller than the second angle (58B) in the intermediate wedge (50), and the second angle (58B) in the intermediate wedge (50) is smaller than the first angle (58C) in the outer wedge (48), while each of the leading edges (54A, 54B, 54C) are substantially the same length, and each of the trailing edges (56A, 56B, 56C) are substantially the same length. Due to this configuration, the inner wedge (52) has an outermost diameter (D1) larger than a diameter (D2) of the intermediate wedge (50), which is larger than the diameter (D3) of the outer wedge (48). This configuration of wedges provides the end fitting (40) with a distribution of forces such that during use the inner wedge (52) receives a greater portion of the compressive force of an operation than the intermediate wedge (50), which receives a greater amount of compressive force than the outer wedge (48). The configuration can also determines a force differential along and within each wedge (48, 50, 52), such that compressive forces along the respective portion of each of the wedges (48, 50, 52) nearest the closed end (44) are greater than those along the respective portion of the wedges (48, 50, 52) near the open end (46).

During use, the sucker rod segment (60) can be secured within the end fitting (40) by first, second and third protruding wedges (62, 64, 66) each formed of cured resin material which is bonded to the sucker rod segment (60) and fills the cavity at each of the wedge portions (48, 50, 52) of end fitting (10). Specifically, a first protruding wedge (62) is shown extending into the respective outer wedge portion (48), a second protruding wedge (64) is shown extending into the intermediate wedge portion (50), and a third protruding wedge (66) is shown extending into the inner wedge portion (52). As the sucker rod is reciprocated in a wellbore, the sucker rod segment (60) will alternatingly experience an axial, tensile force in the direction of the open end (46) (e.g., tending to pull the sucker rod segment (60) from the end fitting (40)), and an axial force in the direction of the closed end (44) (e.g., tending to push the sucker rod segment (60) against the closed end (44).

When subjected to a force in the direction of the open end (46), contact between the innermost protruding wedge (66) formed of resin material extending from the sucker rod segment (60) and the innermost leading edge (54C) will create compressive force, applied to the sucker rod segment (60) at a position corresponding to the inner wedge portion (52). Similarly, contact between the intermediate wedge (64) and the leading edge (54B) of the intermediate wedge portion (50) will create a compressive force, applied to the sucker rod segment (60) at a position corresponding to the intermediate wedge portion (50), that is less than the force applied at the inner wedge portion (52). Contact between the outermost wedge (62) and the outermost leading edge (54A) will create a compressive force, applied to the sucker rod segment (60) at a position corresponding to the outer wedge portion (48), that is less than that applied at the intermediate and inner wedge portions (50, 52). Similarly, when subjected to a force in the direction of the closed end (44), contact between the protruding wedges (62, 64, 66) of epoxy/resin extending from the sucker rod segment (60) and the respective trailing edges (56A, 56B, 56C) will create compressive force, applied to the sucker rod segment (60) at each of the respective wedge portions (48, 50, 52), with compressive force at the closed end (44) exceeding that at the open end (46).

The amount of each compressive force applied at each respective wedge portion (48, 50, 52) can vary depending on the angle at which each of the edges (54A, 56A, 54B, 56B, 54C, 56C) extends relative to the corresponding wedge of epoxy/resin material and therefore also affects the force applied to each wedge portion (48, 50, 52).

It should be understood that while FIG. 2 depicts an embodiment of an end fitting (40) in which the size of each angle (58A, 58B, 58C) progressively increases from the closed end (44) toward the open end (46), in other embodiments, the angles (58A, 58B, 58C) could each be equal, or could be arranged differently, and the leading and trailing edges (54A, 54B, 54C, 56A, 56B, 56C) could be configured to provide the end fitting (40) with a distribution of force such that compressive force experienced at the closed end (44) exceeds that at the open end (46). Additionally, while FIG. 2 depicts an embodiment in which the size of the angles (58A, 58B, 58C) is the sole feature that determines the relative compressive forces applied at each wedge portion (48, 50, 52), it should be understood that any of the outer leading edge (54A), outer trailing edge (56A), and outer angle (58A) of the outer wedge portion (48) could be sized relative to parts of the other wedge portions (50, 52) to provide the open end (46) of the end fitting (40) with a compressive force less than that applied to other portions thereof. Similarly, any of the inner leading edge (54C), inner trailing edge (56C), and inner angle (58C) of the inner wedge portion (52) could be sized relative to parts of the other wedge portions (48, 50) to provide the closed end (44) of the end fitting (40) with a compressive force greater than that applied to other portions thereof. Similarly, any of the intermediate leading edge (54B), intermediate trailing edge (56B), and intermediate angle (58B) could be sized relative to parts of the other wedge portions (48, 52) to provide the intermediate portion of the end fitting (40) with a compressive force greater than that applied to the open end (46) and less than that applied to the closed end (44).

More specifically, the combination of the length of the outer leading edge (54A), the length of the outer trailing edge (56A), and the size of the outer angle (58A) can be configured to provide the outer wedge portion (48) with a first distribution of force. The combination of the length of the intermediate leading edge (54B), the length of the intermediate trailing edge (56B), and the size of the intermediate angle (58B) can be configured to provide the intermediate wedge portion (50) with a second distribution of force. The combination of the length of the inner leading edge (54C), the length of the inner trailing edge (56C), and the size of the inner angle (58C) can be configured to provide the inner wedged shaped portion (52) with a third distribution of force. The third distribution of force can be greater than the second distribution of force, which can be greater than the first distribution of force, to provide the end fitting (40) with a greater compressive force at the closed end (44), which progressively decreases toward the open end (46).

Figure 3:
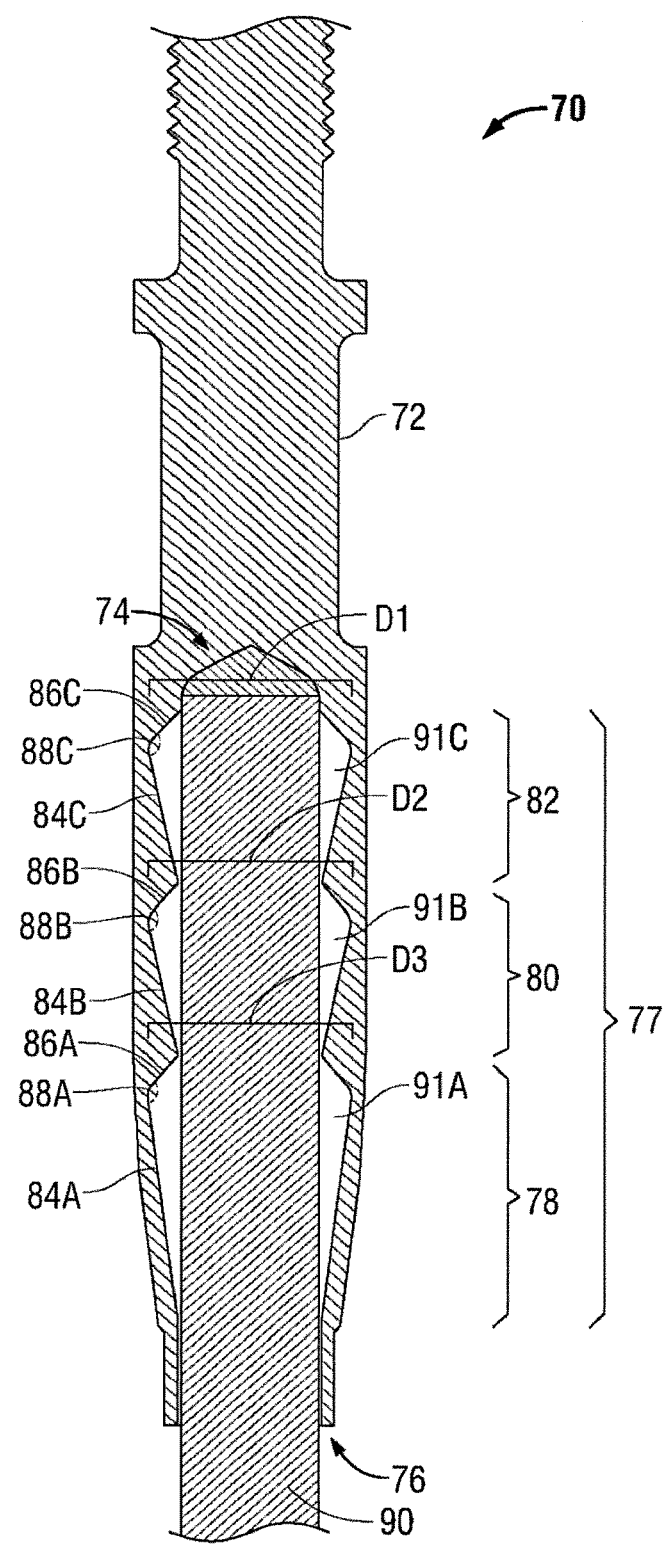
FIG. 3 depicts a diagrammatic side, cross-sectional view of an embodiment of an end fitting usable within the scope of the present disclosure engaged with a segment of a sucker rod.

FIG. 3 depicts a diagrammatic cross sectional view of an embodiment of an end fitting (70) usable within the scope of the present disclosure, having an end of a segment of a sucker rod (90) engaged therein. FIG. 3 depicts another possible configuration and arrangement of components, as described above.

The end fitting (70) is shown having a body (72) (e.g., a generally tubular, cylindrical body). The body (72) can include threads (not shown) or similar means for engagement with adjacent objects (e.g., end fittings secured to subsequent sections of a sucker rod string) at a closed end (74) thereof, while the sucker rod segment (90) can be inserted into and engaged through the open end (76) of the body (72). The portion of the body (72) between the closed and open ends (74, 76) is shown having a bore therein, defining an interior for engagement with the sucker rod segment (90). The interior is depicted having a wedge system, in which the depicted embodiment includes an outer wedge (78), an intermediate wedge (80), and an inner wedge (82).

Each of the wedges (78, 80, 82) includes, generally, a leading edge positioned closer to the open end (76), a trailing edge positioned closer to the closed end (74), and an angle between the leading and trailing edges. Specifically, the outer wedge (78) is shown having a first leading edge (84A), a first trailing edge (86A), and a first angle (88A); the intermediate wedge (80) is shown having a second leading edge (84B), a second trailing edge (86B), and a second angle (88B); and the inner wedge (82) is shown having a third leading edge (84C), a third trailing edge (86C), and a third angle (88C). In an embodiment, one or more of the angles can be obtuse.

In the depicted embodiment, the leading edge (84A) in the outer wedge (78) is longer than the leading edge (84B) in the intermediate wedge (80), which is longer than the leading edge (84C) in the inner wedge (82), while each of the trailing edges (86A, 86B, 86C) are substantially the same length. The angle (88A) in the outer wedge (78) is shown slightly larger than the angle (88B) in the intermediate wedge (80), which is shown slightly larger than the angle (88C) in the inner wedge (82), to accommodate placement of each of the leading edges (84A, 84B, 84C); however, it should be understood that in other embodiments, the length of the leading edges (84A, 84B, 84C) could result in larger or smaller outer diameters of each wedge (78, 80, 82), similar to the embodiment shown in FIG. 2, larger or smaller wedge lengths, or other modifications. The depicted configuration of wedges provides the end fitting (70) with a distribution of forces such that the inner wedge (82) receives a greater portion of the compressive force of an operation than the intermediate wedge (80), which receives a greater amount of force than the outer wedge (78). The configuration can also create a force differential along each wedge, such that compressive forces along the portion of the wedge near the closed end are greater than those along the portion of the wedge near the open end.

During use, the sucker rod segment (90) can be secured within the end fitting (70) by providing adhesive (e.g., epoxy, resin, etc.) into the interior thereof. In addition to bonding to the sucker rod segment (90), the adhesive/epoxy/resin fills each of the wedge regions (78, 80, 82), forming protruding wedge sections (not labeled) that extend from the sucker rod segment (90). As the sucker rod is reciprocated in a wellbore, the sucker rod segment (90) will alternatingly experience an axial, tensile force in the direction of the open end (76) (e.g., tending to pull the sucker rod segment (90) from the end fitting (70)), and an axial force in the direction of the closed end (74) (e.g., tending to push the sucker rod segment (90) against the closed end (74)).

When subjected to a force in the direction of the open end (76), contact between the innermost wedge of epoxy/resin extending from the sucker rod segment (90) and the innermost leading edge (84C) will create a compressive force, applied to the sucker rod segment (90) at a position corresponding to the inner wedge portion (82). Similarly, contact between the intermediate wedge of epoxy/resin and the leading edge (84B) of the intermediate wedge portion (80) will create a compressive force, applied to the sucker rod segment (90) at a position corresponding to the intermediate wedge portion (80), that is less than the force applied at the inner wedge portion (82). Contact between the outermost wedge of epoxy/resin and the outermost leading edge (84A) will create a compressive force, applied to the sucker rod segment (90) at a position corresponding to the outer wedge portion (78), that is less than that applied at the intermediate and inner wedge portions (80, 82). Similarly, when subjected to a force in the direction of the closed end (74), contact between the protruding wedges of epoxy/resin extending from the sucker rod segment (90) and the respective trailing edges (86A, 86B, 86C) will create compressive force, applied to the sucker rod segment (90) at each of the respective wedge portions (78, 80, 82), with compressive force at the closed end (74) exceeding that at the open end (76).

The amount of each compressive force applied at each respective wedge portion (78, 80, 82) can vary (e.g., inversely), depending on the length of each of the leading edges (84A, 84B, 84C) and/or the angle at which each of the edges (84A, 86A, 84B, 86B, 84C, 86C) extends relative to the corresponding wedge of epoxy/resin material.

It should be understood that while FIG. 3 depicts an embodiment of an end fitting (70) in which the length of each leading edge (84A, 84B, 84C) progressively increases from the closed end (74) toward the open end (76), in other embodiments, the leading edges (84A, 84B, 84C) could each be equal in length, or could be arranged differently, and the angles and trailing edges (86A, 86B, 86C, 88A, 88B, 88C) could be configured to provide the end fitting (70) with a distribution of force such that compressive force experienced at the closed end (74) exceeds that at the open end (76). Any of the outer leading edge (84A), outer trailing edge (86A), and outer angle (88A) of the outer wedge portion (78) could be sized relative to parts of the other wedge portions (80, 82) to provide the open end (76) of the end fitting (70) with a compressive force less than that applied to other portions thereof. Similarly, any of the inner leading edge (84C), inner trailing edge (86C), and inner angle (88C) of the inner wedge portion (82) could be sized relative to parts of the other wedge portions (78, 80) to provide the closed end (74) of the end fitting (70) with a compressive force greater than that applied to other portions thereof. Similarly, any of the intermediate leading edge (84B), intermediate trailing edge (86B), and intermediate angle (88B) could be sized relative to parts of the other wedge portions (78, 82) to provide the intermediate portion of the end fitting (70) with a compressive force greater than that applied to the open end (76) and less than that applied to the closed end (74).

The combination of the length of the outer leading edge (84A), the length of the outer trailing edge (86A), and the size of the outer angle (88A) can be configured to provide the outer wedge portion (78) with a first distribution of force. The combination of the length of the intermediate leading edge (84B), the length of the intermediate trailing edge (86B), and the size of the intermediate angle (88B) can be configured to provide the intermediate wedge portion (80) with a second distribution of force. The combination of the length of the inner leading edge (84C), the length of the inner trailing edge (86C), and the size of the inner angle (88C) can be configured to provide the inner wedged shaped portion (82) with a third distribution of force. The third distribution of force can be greater than the second distribution of force, which can be greater than the first distribution of force, to provide the end fitting (70) with a greater compressive force at the closed end (74), which progressively decreases toward the open end (76).

Figure 4:
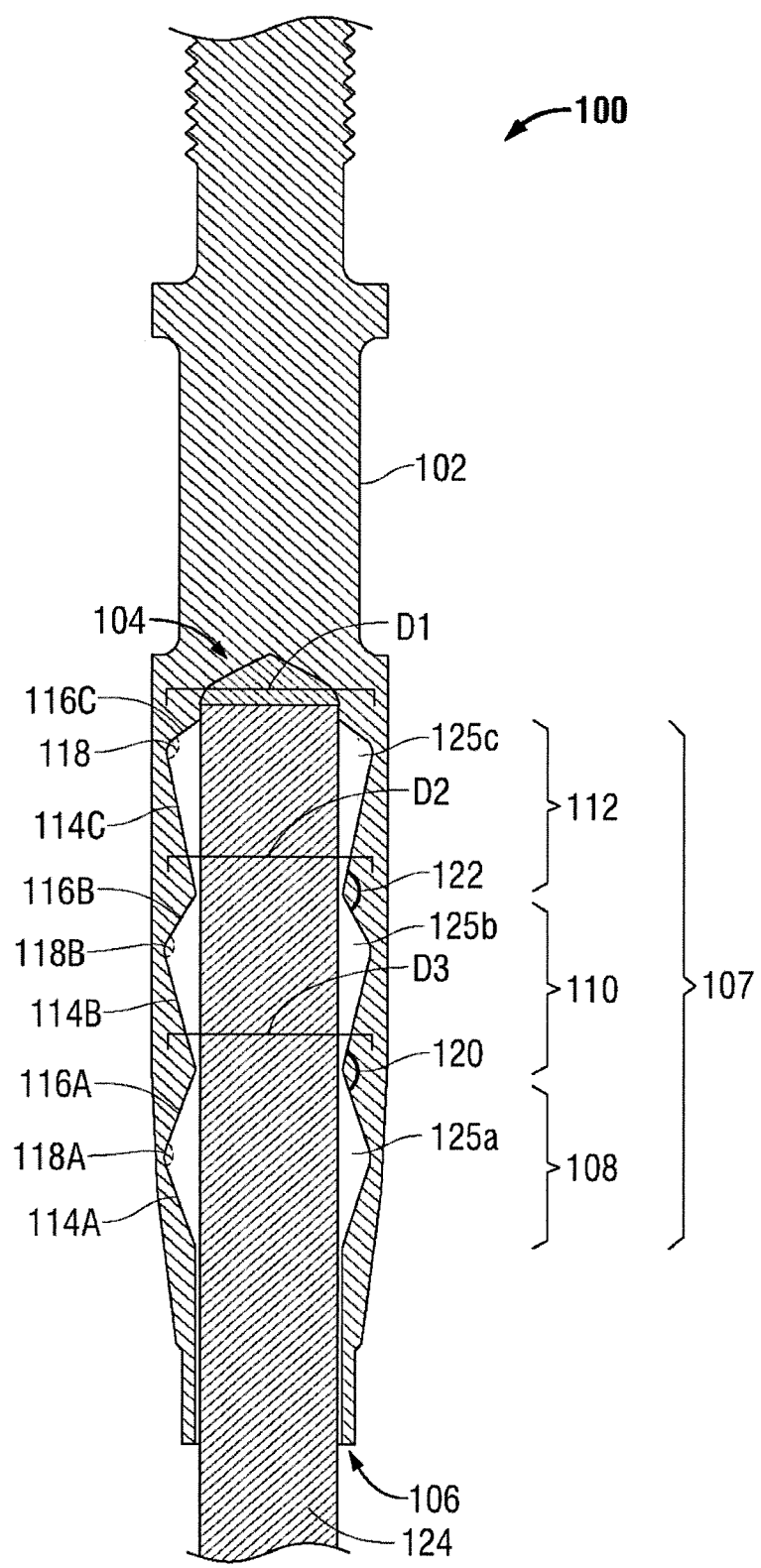
FIG. 4 depicts a diagrammatic side, cross-sectional view of an embodiment of an end fitting usable within the scope of the present disclosure engaged with a segment of a sucker rod.

FIG. 4 depicts a diagrammatic cross sectional view of an embodiment of an end fitting (100) usable within the scope of the present disclosure, having an end of a segment of a sucker rod (124) engaged therein. FIG. 4 depicts another possible configuration and arrangement of components, as described above.

The end fitting (100) is shown having a body (102) (e.g., a generally tubular, cylindrical body). The body (102) can include threads (not shown) or similar means for engagement with adjacent objects (e.g., end fittings secured to subsequent sections of a sucker rod string) at a closed end (104) thereof, while the sucker rod segment (124) can be inserted into and engaged through the open end (106) of the body (102). The portion of the body (102) between the closed and open ends (104, 106) is shown having a bore therein, defining an interior for engagement with the sucker rod segment (124). The interior is depicted having a wedge system, in which the depicted embodiment includes an outer wedge (108), an intermediate wedge (110), and an inner wedge (112).

Each of the wedges (108, 110, 112) includes, generally, a leading edge positioned closer to the open end (106), a trailing edge positioned closer to the closed end (104), and an angle between the leading and trailing edges. Specifically, the outer wedge (108) is shown having a first leading edge (114A), a first trailing edge (116A), and a first angle (118A); the intermediate wedge (110) is shown having a second leading edge (114B), a second trailing edge (116B), and a second angle (118B); and the inner wedge (112) is shown having a third leading edge (114C), a third trailing edge (116C), and a third angle (118C). In an embodiment, one or more of the angles can be obtuse.

In the depicted embodiment, the trailing edge (116A) in the outer wedge (108) is longer than the trailing edge (116B) in the intermediate wedge (110), which is longer than the trailing edge (116C) in the inner wedge (112), while each of the leading edges (114A, 114B, 114C) are substantially the same length. The angles (118A, 118B, 118C) in each of the wedges (108, 110, 112) are also substantially the same size, while a first reflex angle (120) between the outer and intermediate wedges (108, 110), and a second reflex angle (122) between the intermediate and inner wedges (110, 112) are sized to accommodate the progressive increase in the length of the trailing edges (116A, 116B, 116C) from the closed end (104) toward the open end (106). It should be understood that the depicted embodiment is merely exemplary, and the length of the leading edges (114A, 114B, 114C) and/or the size of the angles (118A, 118B, 118C) could be changed to accommodate for the trailing edges (116A, 116B, 116C), as could the outer diameter of the wedges (108, 110, 112) and/or the overall lengths thereof. The depicted configuration of wedges provides the end fitting (100) with a distribution of forces such that the inner wedge (112) receives a greater portion of the compressive force of an operation than the intermediate wedge (110), which receives a greater amount of force than the outer wedge (108). The configuration can also create a force differential along each wedge, such that compressive forces along the portion of the wedge near the closed end are greater than those along the portion of the wedge near the open end.

During use, the sucker rod segment (124) can be secured within the end fitting (100) by providing adhesive (e.g., epoxy, resin, etc.) into the interior thereof. In addition to bonding to the sucker rod segment (124), the adhesive/epoxy/resin fills each of the wedge regions (108, 110, 112)), forming protruding wedge sections (not labeled) that extend from the sucker rod segment (124). As the sucker rod is reciprocated in a wellbore, the sucker rod segment (124) will alternatingly experience an axial, tensile force in the direction of the open end (106) (e.g., tending to pull the sucker rod segment (124) from the end fitting (100)), and an axial force in the direction of the closed end (104) (e.g., tending to push the sucker rod segment (124) against the closed end (104)).

When subjected to a force in the direction of the open end (106), contact between the innermost wedge of epoxy/resin extending from the sucker rod segment (124) and the innermost leading edge (114C) will create compressive force, applied to the sucker rod segment (124) at a position corresponding to the inner wedge portion (112). Similarly, contact between the intermediate wedge of epoxy/resin and the leading edge (114B) of the intermediate wedge portion (110) will create a compressive force, applied to the sucker rod segment (124) at a position corresponding to the intermediate wedge portion (110), that is less than the force applied at the inner wedge portion (112). Contact between the outermost wedge of epoxy/resin and the outermost leading edge (114A) will create a compressive force, applied to the sucker rod segment (124) at a position corresponding to the outer wedge portion (108), that is less than that applied at the intermediate and inner wedge portions (110, 112). Similarly, when subjected to a force in the direction of the closed end (114), contact between the protruding wedges of epoxy/resin extending from the sucker rod segment (124) and the respective trailing edges (116A, 116B, 116C) will create compressive force, applied to the sucker rod segment (124) at each of the respective wedge portions (108, 110, 112), with compressive forces at the closed end (104) exceeding those at the open end (106).

The amount of each compressive force applied at each respective wedge portion (108, 110, 112) can vary (e.g., inversely), depending on the length of each of the trailing edges (116A, 116B, 116C) and/or the angle at which each of the edges (114A, 114B, 114C, 116A, 116B, 116C) extends relative to the corresponding wedge of epoxy/resin material.

It should be understood that while FIG. 4 depicts an embodiment of an end fitting (100) in which the length of each trailing edge (116A, 116B, 116C) progressively increases from the closed end (104) toward the open end (106), in other embodiments, the trailing edges (116A, 116B, 116C) could each be equal in length, or could be arranged differently, and the angles and leading edges (116A, 116B, 116C, 118A, 118B, 118C) could be configured to provide the end fitting (100) with a distribution of force such that compressive force experienced at the closed end (104) exceeds that at the open end (106). Any of the outer leading edge (114A), outer trailing edge (116A), and outer angle (118A) of the outer wedge portion (108) could be sized relative to parts of the other wedge portions (110, 112) to provide the open end (106) of the end fitting (100) with a compressive force less than that applied to other portions thereof. Similarly, any of the inner leading edge (114C), inner trailing edge (116C), and inner angle (118C) of the inner wedge portion (112) could be sized relative to parts of the other wedge portions (108, 110) to provide the closed end (104) of the end fitting (100) with a compressive force greater than that applied to other portions thereof. Similarly, any of the intermediate leading edge (114B), intermediate trailing edge (116B), and intermediate angle (118B) could be sized relative to parts of the other wedge portions (108, 112) to provide the intermediate portion of the end fitting (100) with a compressive force greater than that applied to the open end (106) and less than that applied to the closed end (104).

The combination of the length of the outer leading edge (114A), the length of the outer trailing edge (116A), and the size of the outer angle (118A) can be configured to provide the outer wedge portion (108) with a first distribution of force. The combination of the length of the intermediate leading edge (114B), the length of the intermediate trailing edge (116B), and the size of the intermediate angle (118B) can be configured to provide the intermediate wedge portion (110) with a second distribution of force. The combination of the length of the inner leading edge (114C), the length of the inner trailing edge (116C), and the size of the inner angle (118C) can be configured to provide the inner wedged shaped portion (112) with a third distribution of force. The third distribution of force can be greater than the second distribution of force, which can be greater than the first distribution of force, to provide the end fitting (100) with a greater compressive force at the closed end (104), which progressively decreases toward the open end (106).

Figure 5:
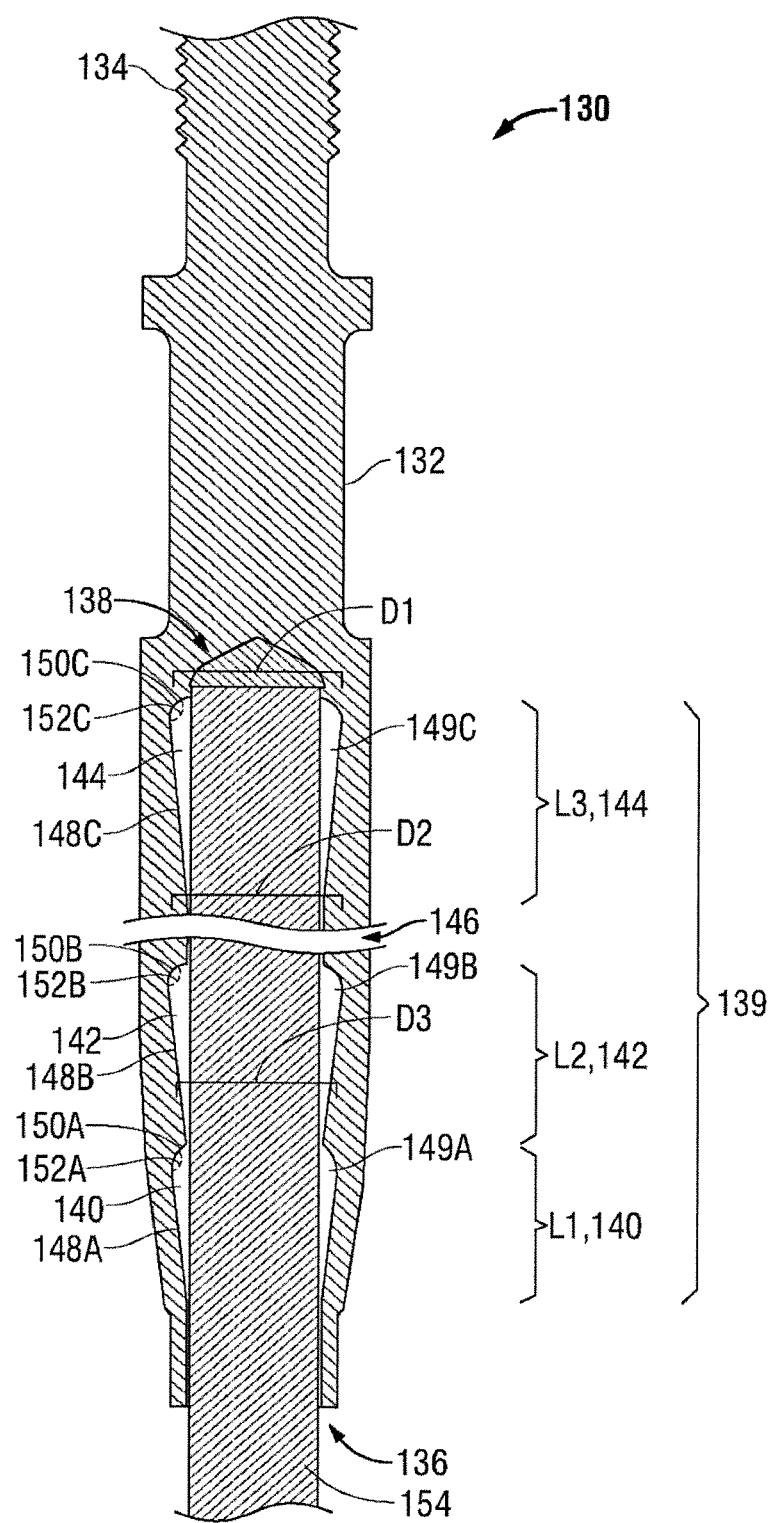
FIG. 5 depicts a diagrammatic side, cross-sectional view of an embodiment of an end fitting usable within the scope of the present disclosure engaged with a segment of a sucker rod.

FIG. 5 depicts a diagrammatic cross sectional view of an embodiment of an end fitting (130) usable within the scope of the present disclosure, having an end of a segment of a sucker rod (154) engaged therein. FIG. 5 depicts another possible configuration and arrangement of components, as described above.

The end fitting (130) is shown having a body (132) (e.g., a generally tubular, cylindrical body). The body (132) can include threads (134) or similar means for engagement with adjacent objects (e.g., end fittings secured to subsequent sections of a sucker rod string) at a closed end (138) thereof, while the sucker rod segment (154) can be inserted into and engaged through the open end (136) of the body (132). The portion of the body (132) between the open and closed ends (136, 138) is shown having a bore therein, defining an interior for engagement with the sucker rod segment (154). The interior is shown having a wedge system, in which the depicted embodiment includes an outer wedge (140), an intermediate wedge (142), and an inner wedge (144). FIG. 5 also includes a dashed line (146), representative of the fact that while the depicted end fitting (130) is shown having three wedges (140, 142, 144), any number of additional wedges could be included in the wedge system without departing from the scope of the present disclosure. In other embodiments, fewer than three wedges (e.g., two wedges) could be used.

Each of the wedges (140, 142, 144) includes, generally, a leading edge positioned closer to the open end (136), a trailing edge positioned closer to the closed end (138), and an angle between the leading and trailing edges. Specifically, the outer wedge (140) is shown having a first leading edge (148A), a first trailing edge (150A), and a first angle (152A); the intermediate wedge (142) is shown having a second leading edge (148B), a second trailing edge (150B), and a second angle (152B); and the inner wedge (144) is shown having a third leading edge (148C), a third trailing edge (150C), and a third angle (152C). In an embodiment, one or more of the angles can be obtuse.

In the depicted embodiment, the leading edge (148A), trailing edge (150A), and angle (152A) in the outer wedge portion (140) provide the outer wedge portion (140) with a first overall wedge length (L1); the leading edge (148B), trailing edge (150B), and angle (152B) in the intermediate wedge portion (142) provide the intermediate wedge portion (142) with a second overall wedge length (L2); and the leading edge (148C), trailing edge (150C), and angle (152C) in the inner wedge portion (144) provide the inner wedge portion (144) with a third overall wedge length (L3). The third wedge length (L3) is greater than the second wedge length (L2), which is greater than the first wedge length (L1). It should be understood that the depicted embodiment is merely exemplary, and the lengths of the leading edges (148A, 148B, 148C) or trailing edges (150A, 150B, 150C), and/or the size of the angles (152A, 152B, 152C) can vary, as can the outer diameter of the wedges (140, 142, 144). The depicted configuration of wedges provides the end fitting (130) with a distribution of forces such that the inner wedge (144) receives a greater portion of the compressive force of an operation than the intermediate wedge (142), which receives a greater amount of force than the outer wedge (140). The configuration can also create a force differential along each wedge, such that compressive forces along the portion of the wedge near the closed end are greater than those along the portion of the wedge near the open end.

During use, the sucker rod segment (154) can be secured within the end fitting (130) by providing adhesive (e.g., epoxy, resin, etc.) into the interior thereof. In addition to bonding to the sucker rod segment (154), the adhesive/epoxy/resin fills each of the wedge regions (140, 142, 144) forming protruding wedge sections that extend from the sucker rod segment (154). As the sucker rod is reciprocated in a wellbore, the sucker rod segment (154) will alternatingly experience an axial, tensile force in the direction of the open end (136) (e.g., tending to pull the sucker rod segment (154) from the end fitting (130)), and an axial force in the direction of the closed end (138) (e.g., tending to push the sucker rod segment (154) against the closed end (138)).

When subjected to a force in the direction of the open end (136), contact between the innermost wedge of epoxy/resin extending from the sucker rod segment (154) and the innermost leading edge (148C) will create compressive force, applied to the sucker rod segment (154) at a position corresponding to the inner wedge portion (144). Similarly, contact between the intermediate wedge of epoxy/resin and the leading edge (148B) of the intermediate wedge portion (142) will create a compressive force, applied to the sucker rod segment (154) at a position corresponding to the intermediate wedge portion (142), that is less than the force applied at the inner wedge portion (144). Contact between the outermost wedge of epoxy/resin and the outermost leading edge (148A) will create a compressive force, applied to the sucker rod segment (154) at a position corresponding to the outer wedge portion (140), that is less than that applied at the intermediate and inner wedge portions (142, 144). Similarly, when subjected to a force in the direction of the closed end (138), contact between the protruding wedges of epoxy/resin extending from the sucker rod segment (154) and the respective trailing edges (150A, 150B, 150C) will create compressive force, applied to the sucker rod segment (154) at each of the respective wedge portions (140, 142, 144), with compressive forces at the closed end (138) exceeding those at the open end (136).

The amount of each compressive force applied at each respective wedge portion (140, 142, 144) can vary (e.g., proportionally), depending on the length of each of the leading or trailing edges and/or the angle at which each of the edges extends relative to the corresponding wedge of epoxy/resin material.

It should be understood that while FIG. 5 depicts an embodiment of an end fitting (130) in which the overall length of each wedge (140, 142, 144) progressively decreases from the closed end (138) toward the open end (136), in other embodiments, the wedge lengths (L1, L2, L3) could be equal or otherwise arranged, while the leading edge lengths, trailing edge lengths, and/or sizes of the angels between the leading and trailing edges could be configured to provide the end fitting (130) with a distribution of force such that compressive force experienced at the closed end (138) exceeds that at the open end (136).

The combination of the length of the outer leading edge (148A), the length of the outer trailing edge (150A), and the size of the outer angle (152A) can be configured to provide the outer wedge portion (140) with a first distribution of force. The combination of the length of the intermediate leading edge (148B), the length of the intermediate trailing edge (150B), and the size of the intermediate angle (152B) can be configured to provide the intermediate wedge portion (142) with a second distribution of force. The combination of the length of the inner leading edge (148C), the length of the inner trailing edge (150C), and the size of the inner angle (152C) can be configured to provide the inner wedged shaped portion (144) with a third distribution of force. The third distribution of force can be greater than the second distribution of force, which can be greater than the first distribution of force, to provide the end fitting (130) with a greater compressive force at the closed end (138), which progressively decreases toward the open end (136).

Figure 6:
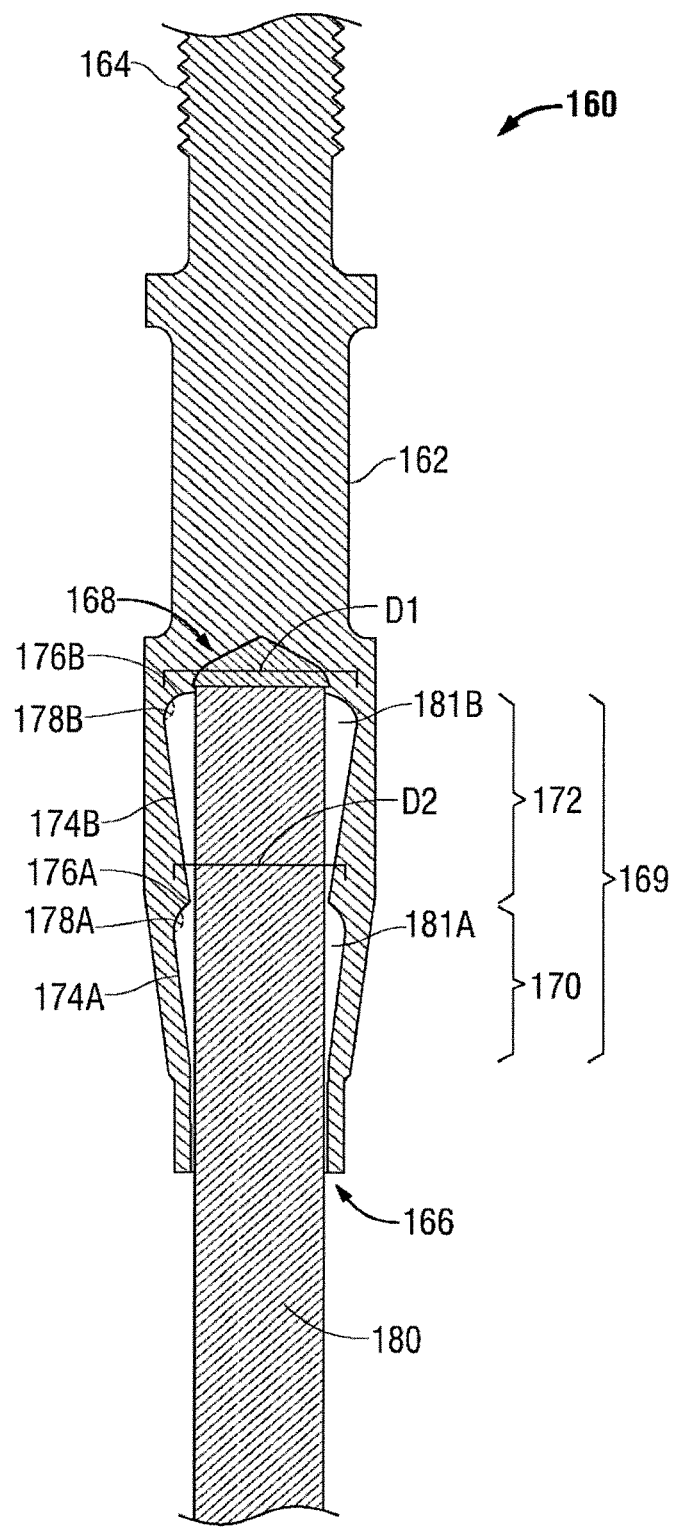
FIG. 6 depicts a diagrammatic side, cross-sectional view of an embodiment of an end fitting usable within the scope of the present disclosure engaged with a segment of a sucker rod.

FIG. 6 depicts a diagrammatic cross sectional view of an embodiment of an end fitting (160) usable within the scope of the present disclosure, having an end of a segment of a sucker rod (180) engaged therein. It should be understood that the embodiment shown in FIG. 6 is merely an illustrative, diagrammatic view of one possible configuration and arrangement of components, and, as described above, the specific dimensions and arrangement of portions of the end fitting (160), most notably the configuration of the wedge system depicted in the interior thereof, can be varied without departing from the scope of the present disclosure.

The end fitting (160) is shown having a body (162) (e.g., a generally tubular, cylindrical body), with threads (164) at one end thereof for engaging an adjacent object (e.g., a connector engaged with a subsequent section of a sucker rod string). The depicted end fitting (160) includes an open end (166), through which the sucker rod segment (180) can be engaged, and a closed end (168) opposite the open end (166). A portion of the body (162) between the closed and open ends (166, 168) can be generally hollow, e.g., having a bore therein, defining an interior for engagement with the sucker rod segment (180). Within the interior is a wedge system, in which the depicted embodiment includes an outer wedge (170) and an inner wedge (172). The embodiment depicted in FIG. 6 is illustrative of the fact that end fittings usable within the scope of the present disclosure can include fewer than three wedges (e.g., two wedges).

Each of the wedges (170, 172) includes, generally, a leading edge positioned closer to the open end (166), a trailing edge positioned closer to the closed end (168), and an angle between the leading and trailing edges. Specifically, the outer wedge (170) is shown having a first leading edge (174A), a first trailing edge (176A), and a first angle (178A), and the inner wedge (172) is shown having a second leading edge (174B), a second trailing edge (176B), and a second angle (178B). In an embodiment, one or more of the angles can be obtuse. In the depicted embodiment, the second leading edge (174B) has a length greater than that of the first leading edge (174A), the first angle (178A) is larger than the second angle (178B), the inner wedge (172) has a greater overall wedge length than the outer wedge (170), and the inner wedge (172) has a greater outer diameter than the outer wedge (170). The depicted configuration of wedges provides the end fitting (160) with a distribution of forces such that the inner wedge (172) receives a greater portion of the compressive force of an operation than the outer wedge (170). The configuration can also create a force differential along each wedge, such that compressive forces along the portion of the wedge near the closed end are greater than those along the portion of the wedge near the open end.

During use, the sucker rod segment (180) can be secured within the end fitting (160) by providing adhesive (e.g., epoxy, resin, etc.) into the interior thereof. In addition to bonding to the sucker rod segment (180), the adhesive/epoxy/resin fills each of the wedge regions (170, 172), forming protruding wedge sections (not labeled) that extend from the sucker rod segment (180). As the sucker rod is reciprocated in a wellbore, the sucker rod segment (180) will alternately experience an axial, tensile force in the direction of the open end (166) (e.g., tending to pull the sucker rod segment (180) from the end fitting (160)), and an axial force in the direction of the closed end (168) (e.g., tending to push the sucker rod segment (180) against the closed end (168)).

When subjected to a force in the direction of the open end (166), contact between the protruding wedges of epoxy/resin extending from the sucker rod segment (180) and the leading edges (174A, 174B) will create compressive force, applied to the sucker rod segment (180) at each of the respective wedge portions (170, 172). When subjected to a force in the direction of the closed end (168), contact between the protruding wedges of epoxy/resin extending from the sucker rod segment (180) and the trailing edges (176A, 176B) will create compressive force, applied to the sucker rod segment (180) at each of the respective wedge portions (170, 172). The amount of each compressive force applied to each respective wedge portion (170, 172) can vary (e.g., proportionally), depending on the length of the leading edge (174A, 174B), or trailing edge (176A, 176B) against which the protruding wedge of epoxy/resin is urged by the axial force from reciprocation of the sucker rod string. The size of the angles (178A, 178B) affects the angle at which each of the edges (174A, 174B, 176A, 176B) extends relative to the corresponding wedge of epoxy/resin material and therefore also affects the force applied to each wedge portion (170, 172).

Figure 7:
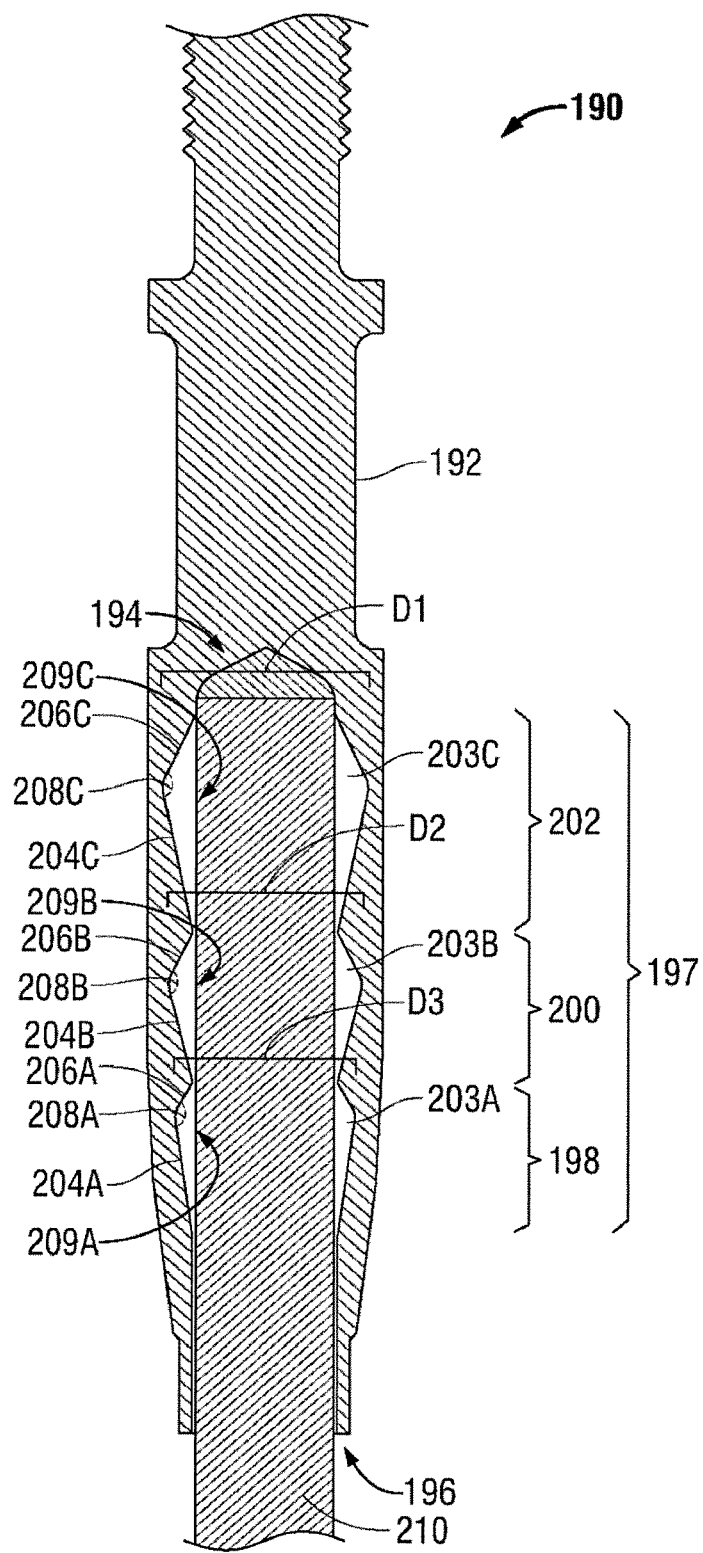
FIG. 7 depicts a diagrammatic side, cross-sectional view of an embodiment of an end fitting usable within the scope of the present disclosure engaged with a segment of a sucker rod.

FIG. 7 depicts a diagrammatic side, cross-sectional view of an embodiment of an end fitting (190) usable within the scope of the present disclosure, engaged with a segment of a fiberglass composite sucker rod (210). Except as otherwise illustrated in FIG. 7 or described here, end fitting (190) is identical to end fitting (10), which is illustrated in FIG. 1 and described in the discussion thereof. End fitting (190) includes wedge system (197) having outer wedge portion (198) configured to distribute compressive force in the sucker rod (210) proximate the open end (196), and inner wedge portion (202) configured to distribute compressive force in the sucker rod (196) proximate the closed end (194). Referring to FIG. 7, in the specific arrangement illustrated inner wedge portion (202) has a respective overall length along a respective inner baseline (209C) exceeding the overall length of outer wedge portion (198) along respective outer baseline (209A), and outer wedge portion (198) has a respective overall length along outer baseline (209A) exceeding the overall length of intermediate wedge portion (200) along respective intermediate baseline (209B). Also in the specific arrangement illustrated in FIG. 7, the length of inner leading edge (204C) of respective inner wedge portion (202) exceeds the length of outer leading edge (204A) of respective outer wedge portion (198), and the length of outer leading edge (204A) of outer wedge portion (198) exceeds the length of intermediate leading edge (204B) of respective intermediate wedge portion (200). In the specific arrangement illustrated in FIG. 7, the length of inner trailing edge (206C) of respective inner wedge portion (202) exceeds the length of outer trailing edge (206A) of respective outer wedge portion (198), and the length of outer trailing edge (206A) of outer wedge portion (198) exceeds the length of intermediate trailing edge (206B) of respective intermediate wedge portion (200). Particularly in the embodiment illustrated in FIG. 7, the outer wedge portion (198) is of different cross-sectional geometric configuration than the inner wedge portion (202), such that proportionate reduction by the outer wedge portion (198) of compressive force in the sucker rod (210) proximate the open end (196) is greater than proportionate reduction by the inner wedge portion (202) of compressive force in the sucker rod (210) proximate the closed end (194). Particularly, the inner wedge portion (202) is configured to distribute more compressive force in the sucker rod (210) proximate the closed end (194) than proximate the open end (196), and the outer wedge portion (198) is configured to distribute less compressive force in the sucker rod (210) proximate the open end (196) than proximate the closed end (194).

Figure 8:
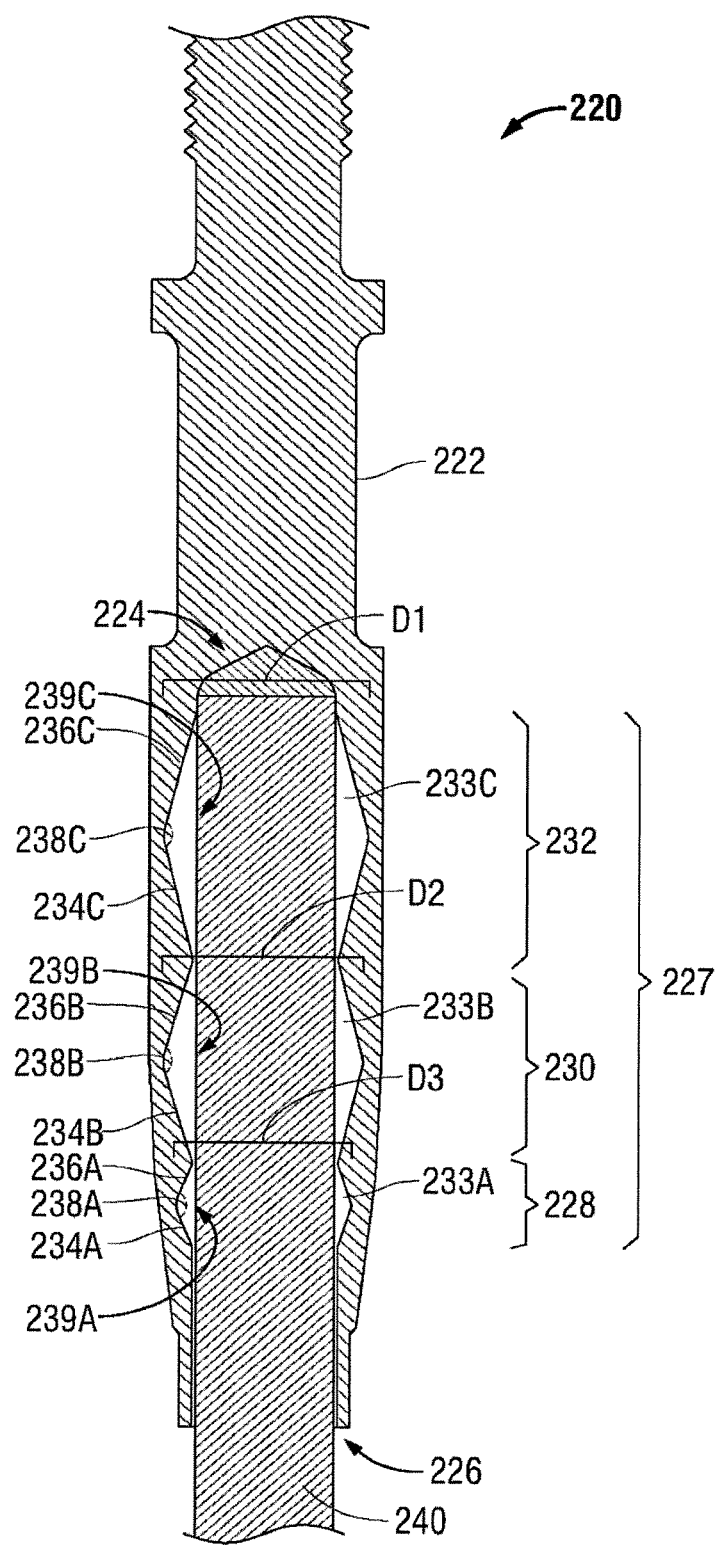
FIG. 8 depicts a diagrammatic side, cross-sectional view of an embodiment of an end fitting usable within the scope of the present disclosure engaged with a segment of a sucker rod.

FIG. 8 depicts a diagrammatic side, cross-sectional view of an embodiment of an end fitting (220) usable within the scope of the present disclosure, engaged with a segment of a fiberglass composite sucker rod (240). Except as otherwise illustrated in FIG. 8 or described here, end fitting (220) is identical to end fitting (10), which is illustrated in FIG. 1 and described in the discussion thereof. End fitting (220) includes wedge system (227) having outer wedge portion (228) configured to distribute compressive force in the sucker rod (240) proximate the open end (226), and inner wedge portion (232) configured to distribute compressive force in the sucker rod (240) proximate the closed end (226). Referring to FIG. 8, in the specific arrangement illustrated inner wedge portion (232) has a respective overall length along a respective inner baseline (239C) exceeding the overall length of intermediate wedge portion (230) along respective intermediate baseline (239B), and intermediate wedge portion (230) has a respective overall length along intermediate baseline (239B) exceeding the overall length of outer wedge portion (228) along respective outer baseline (239A). Also in the specific arrangement illustrated in FIG. 8, the length of inner leading edge (234C) of respective inner wedge portion (232) exceeds the length of intermediate leading edge (234B) of respective intermediate wedge portion (230), and the length of intermediate leading edge (234B) of intermediate wedge portion (230) exceeds the length of outer leading edge (234A) of respective outer wedge portion (232). In the specific arrangement illustrated in FIG. 8, the length of inner trailing edge (236C) of respective inner wedge portion (232) exceeds the length of intermediate trailing edge (236B) of respective intermediate wedge portion (230), and the length of intermediate trailing edge (236B) of intermediate wedge portion (230) exceeds the length of outer trailing edge (236A) of respective outer wedge portion (228). Particularly in the embodiment illustrated in FIG. 8, the outer wedge portion (228) is of different cross-sectional geometric configuration than the inner wedge portion (232), such that proportionate reduction by the outer wedge portion (228) of compressive force in the sucker rod (240) proximate the open end (226) is greater than proportionate reduction by the inner wedge portion (232) of compressive force in the sucker rod (240) proximate the closed end (224). Particularly, the inner wedge portion (232) is configured to distribute more compressive force in the sucker rod (240) proximate the closed end (224) than proximate the open end (226), and the outer wedge portion (228) is configured to distribute less compressive force in the sucker rod (240) proximate the open end (226) than proximate the closed end 224).

Figure 9:
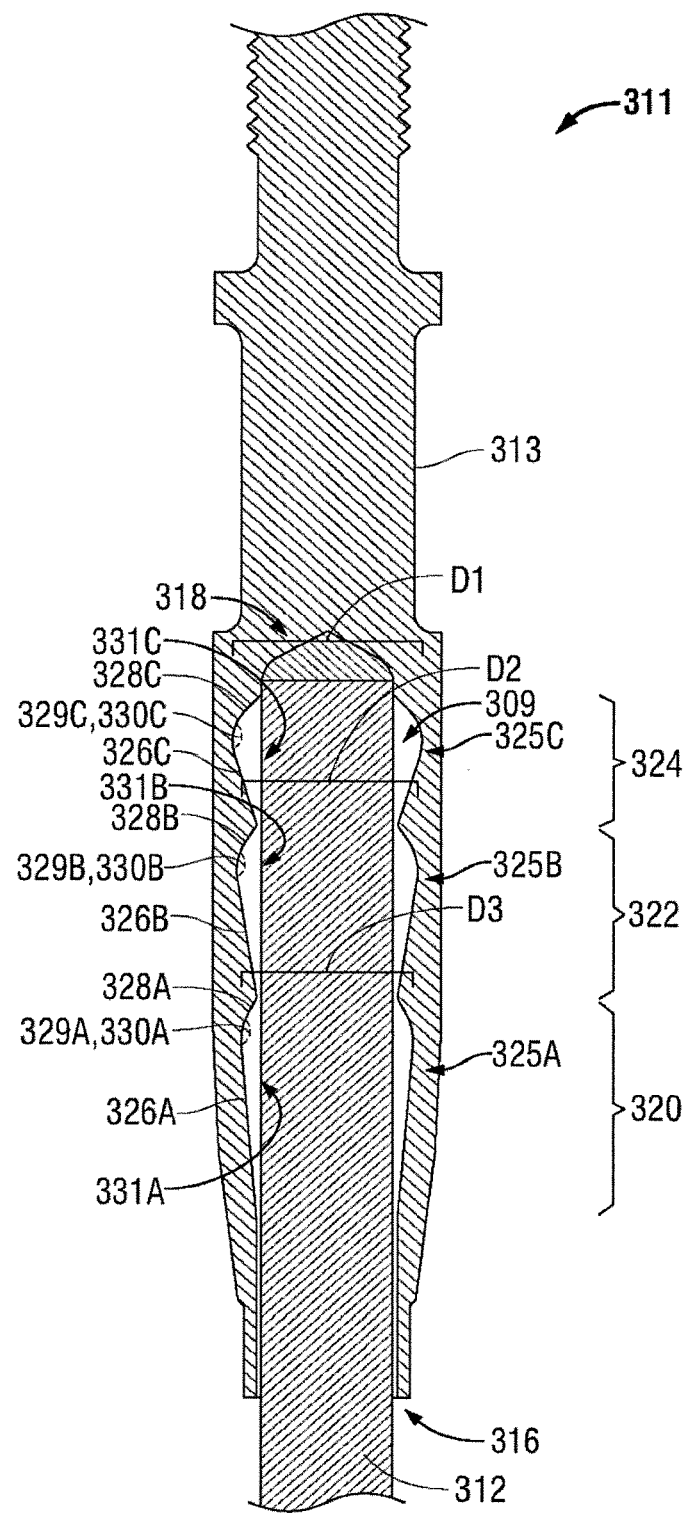
FIG. 9 depicts a diagrammatic side, cross-sectional view of an embodiment of an end fitting usable within the scope of the present disclosure engaged with a segment of a sucker rod.

FIG. 9 depicts a diagrammatic side, cross-sectional view of an embodiment of an end fitting (311) usable within the scope of the present disclosure engaged with a segment of a fiberglass composite sucker rod (312). Except as otherwise illustrated in FIG. 9 or described here, end fitting (311) is identical to end fitting (10), which is illustrated in FIG. 1 and described in the discussion thereof. End fitting (311) includes outer wedge portion (320) configured to distribute compressive force in the sucker rod (312) proximate the open end (316), and inner wedge portion (324) configured to distribute compressive force in the sucker rod (312) proximate the closed end (318). Referring to FIG. 9, in the specific arrangement illustrated outer wedge portion (320) has a respective overall length along outer baseline (331A) exceeding the overall length of intermediate wedge portion (322) along respective intermediate baseline (331B), and intermediate wedge portion (322) has a respective overall length along intermediate baseline (331B) exceeding the overall length of inner wedge portion (324) along respective outer baseline (331A). Also in the specific arrangement illustrated in FIG. 9, the length of outer leading edge (226A) of respective outer wedge portion (320) exceeds the length of intermediate leading edge (326B) of respective intermediate wedge portion (322), and the length of intermediate leading edge (326B) of intermediate wedge portion (322) exceeds the length of inner leading edge (326C) of respective inner wedge portion (324). In the specific arrangement illustrated in FIG. 9, the length of inner trailing edge (328C) of respective inner wedge portion (324) exceeds the length of intermediate trailing edge (328B) of respective intermediate wedge portion (322), and the length of intermediate trailing edge (328B) of intermediate wedge portion (322) exceeds the length of outer trailing edge (328A) of respective outer wedge portion (320). In the specific embodiment illustrated in FIG. 9, it will be understood that outer vertex angle (330A) exceeds intermediate vertex angle (330B), and intermediate vertex angle (330B) exceeds inner vertex angle (330C). Particularly in the embodiment illustrated in FIG. 9, the outer wedge portion (320) is of different cross-sectional geometric configuration than the inner wedge portion (324), such that proportionate reduction by the outer wedge portion (324) of compressive force in the sucker rod (312) proximate the open end (316) is greater than proportionate reduction by the inner wedge portion (324) of compressive force in the sucker rod (312) proximate the closed end (318). Particularly, the inner wedge portion (324) is configured to distribute more compressive force in the sucker rod (312) proximate the closed end (318) than proximate the open end (316), and the outer wedge portion (324) is configured to distribute less compressive force in the sucker rod (312) proximate the open end (316) than proximate the closed end 318). Particularly in the embodiment illustrated in FIG. 9, the length of the first leading edge (326A) exceeds the length of the third leading edge (326C) for establishing a force distribution characteristic of the outer wedge portion (320) relative to the inner wedge portion (324). Particularly in the embodiment illustrated in FIG. 9, the length of the first leading edge (326A) exceeds the length of the second leading edge (326B); the length of the second leading edge (326B) exceeds the length of the third leading edge (326C); and the relative lengths of the first leading edge (326A), second leading edge (326B) and third leading edge (326C) establish relative force distribution characteristics of the outer wedge portion (320), intermediate wedge portion (322) and inner wedge portion (324), such that compressive force in the sucker rod (312) proximate the closed end (318) exceeds compressive force in the sucker rod (312) proximate the open end (316). More particularly in accordance with the relationships described herein, the configuration establishes relative force distribution characteristics of the outer wedge portion (320), intermediate wedge portion (322) and inner wedge portion (324), such that compressive force in the sucker rod (312) proximate the closed end (316) exceeds compressive force in the sucker rod (312) intermediate the open end (316) and closed end (318), and such that compressive force in the sucker rod (312) intermediate the open end (316) and closed end (318) exceeds compressive force in the sucker rod (312) proximate the open end (316). Particularly in the embodiment illustrated in FIG. 9, the outer wedge portion (320) has an outer wedge height defined between the outer vertex (329A) and the outer baseline (331A), the intermediate wedge portion (322) has an intermediate wedge height defined between the intermediate vertex (329B) and the intermediate baseline (331B), and the inner wedge portion (324) has an inner wedge height defined between the inner vertex (329C) and the inner baseline (331C); the inner wedge height is greater than or equal to the intermediate wedge height, and the intermediate wedge height is greater than or equal to the outer wedge height. It will be understood that the diameter of the interior of body (313) relative to a central longitudinal axis of end fitting (311) at inner vertex (329C), intermediate vertex (329B) and outer vertex (329A) varies in relation to respective of the inner wedge height, intermediate wedge height, and outer wedge height, such that the maximum diameter of the interior of body (313) exists at inner vertex (329C); diameter at inner vertex (329C) exceeds diameter at intermediate vertex (329B); and diameter at intermediate vertex (329B) exceeds diameter at outer vertex (329A).

Figure 10:
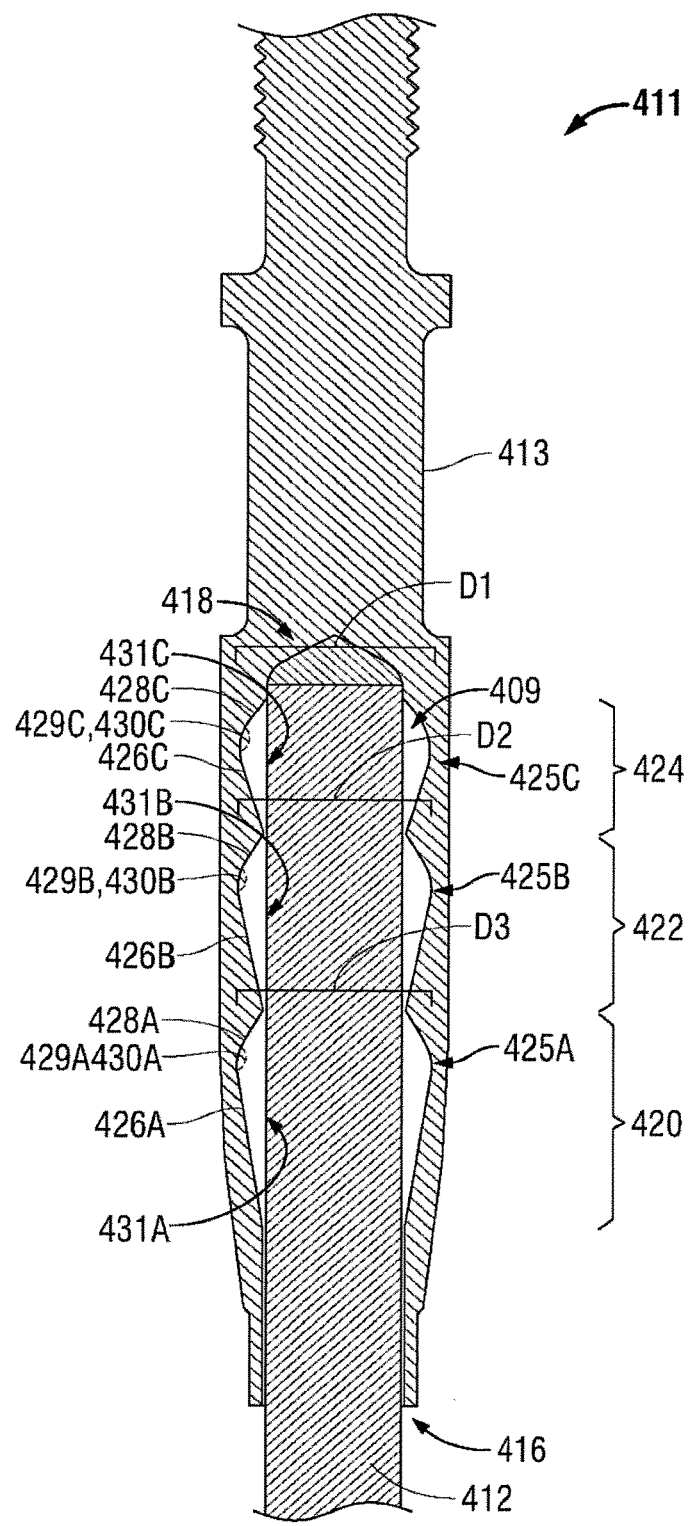
FIG. 10 depicts a diagrammatic side, cross-sectional view of an embodiment of an end fitting usable within the scope of the present disclosure engaged with a segment of a sucker rod.

FIG. 10 depicts a diagrammatic side, cross-sectional view of an embodiment of an end fitting (410) usable within the scope of the present disclosure engaged with a segment of a fiberglass composite sucker rod (412). Except as otherwise illustrated in FIG. 10 or described here, end fitting (410) is identical to end fitting (10), which is illustrated in FIG. 1 and described in the discussion thereof. Referring to FIG. 10, in the specific arrangement illustrated outer wedge portion (420) has a respective overall length along outer baseline (431A) exceeding the overall length of intermediate wedge portion (422) along respective intermediate baseline (431B), and intermediate wedge portion (422) has a respective overall length along intermediate baseline (431B) exceeding the overall length of inner wedge portion (424) along respective outer baseline (431A). Also in the specific arrangement illustrated in FIG. 10, the length of outer leading edge (426A) of respective outer wedge portion (420) exceeds the length of intermediate leading edge (426B) of respective intermediate wedge portion (422), and the length of intermediate leading edge (426B) of intermediate wedge portion (422) exceeds the length of inner leading edge (426C) of respective inner wedge portion (424). In the specific arrangement illustrated in FIG. 10, the height of respective inner wedge portion (424) from inner vertex (429C) to inner baseline (431C) exceeds the height of intermediate wedge portion (428B), and the height of intermediate wedge portion (428B) of intermediate wedge portion (322) exceeds the height of outer wedge portion (420). In the particular embodiment illustrated in FIG. 10, it will be understood that interior diameters of end fitting (410) at inner vertex (429C), intermediate vertex (429B) and outer vertex (429A) are identical. End fitting (410) includes inner wedge (424) having a respective inner wedge triangular configuration (425C) differing from outer wedge (420) having a respective outer wedge triangular configuration (425A) to bias distribution of compressive force in the sucker rod (412) at the end fitting (410) during use. The outer wedge triangular configuration (425A) confines the outer wedge portion (420) to distribute relatively less compressive force in the sucker rod (412) proximate the open end (416) than distributed by the inner wedge portion (424) in the sucker rod (412) proximate the closed end (418). The inner wedge triangular configuration (425C) confines the inner wedge portion (424) to distribute relatively more compressive force in the sucker rod (412) proximate the closed end (418) than distributed by the outer wedge portion (420) in the sucker rod (412) proximate the open end (416). Particularly, the inner wedge triangular configuration (425C) differs from the outer wedge triangular configuration (425A) to bias distribution of compressive force in the sucker rod (412) at the end fitting (410) during use, the outer wedge triangular configuration (425A) confining the outer wedge portion (420) to distribute less compressive force in the sucker rod (412) proximate the open end (416) than distributed by the inner wedge portion (424) in the sucker rod (412) proximate the closed end (418). The inner wedge triangular configuration (425C) confines the inner wedge portion (424) to distribute more compressive force in the sucker rod (412) proximate the closed end (418) than distributed by the outer wedge portion (420) in the sucker rod (412) proximate the open end (416). Particularly in the embodiment illustrated in FIG. 10, the inner wedge triangular configuration (425C) differs from the outer wedge triangular configuration (425A) to bias distribution of compressive force in the sucker rod (412) at the end fitting (410) during use; the outer wedge triangular configuration (425A) confining the outer wedge portion (420) to reduce compressive force in the sucker rod (412) proximate the open end (416) below compressive force in the sucker rod (412) proximate the closed end (418); and the inner wedge triangular configuration (425C) confines the inner wedge portion (424) to maintain compressive force in the sucker rod (412) proximate the closed end (418) above compressive force in the sucker rod (412) proximate the open end (416). Particularly in the embodiment illustrated in FIG. 10, the wedge system (414) comprises an intermediate wedge portion (422) formed in the interior between the inner wedge portion (424) and outer wedge portion (420), and the intermediate wedge portion (422) is configured to distribute compressive force in the sucker rod (412) intermediate the inner wedge portion (424) and outer wedge portion (420). The intermediate wedge portion (422) in cross-section has a respective intermediate wedge triangular configuration (425B) including a respective intermediate leading edge (426B) extending between the outer wedge portion (420) and an intermediate trailing edge (428B), and the intermediate leading edge (426B) intersects the intermediate trailing edge (428B) at a respective intermediate vertex (429B) characterized by a respective intermediate vertex angle (430B). The intermediate wedge triangular configuration (425B) has an imaginary intermediate triangle base (431B) opposite the intermediate vertex 429B). The intermediate wedge triangular configuration (425B) determines distribution by the intermediate wedge portion (422) of compressive force in the sucker rod (412) proximate the intermediate wedge portion (422) between the inner wedge portion (424) and outer wedge portion (420). The intermediate wedge triangular configuration (425B) differs from the inner wedge triangular configuration (425C) to bias distribution of compressive force in the sucker rod (412) at the end fitting (410) during use. The intermediate wedge triangular configuration (425B) confines the intermediate wedge portion (422) to distribute relatively less compressive force in the sucker rod (412) proximate the intermediate portion (422) between the closed end (418) and open end (416) than distributed by the inner wedge portion (424) in the sucker rod (412) proximate the closed end (418). The intermediate wedge geometric configuration (425B) confines the intermediate wedge portion (422) to distribute relatively more compressive force in the sucker rod (412) proximate the intermediate portion (422) between the closed end (418) and open end (416) than distributed by the outer wedge portion (420) in the sucker rod (412) proximate the open end (416).

Figure 11:
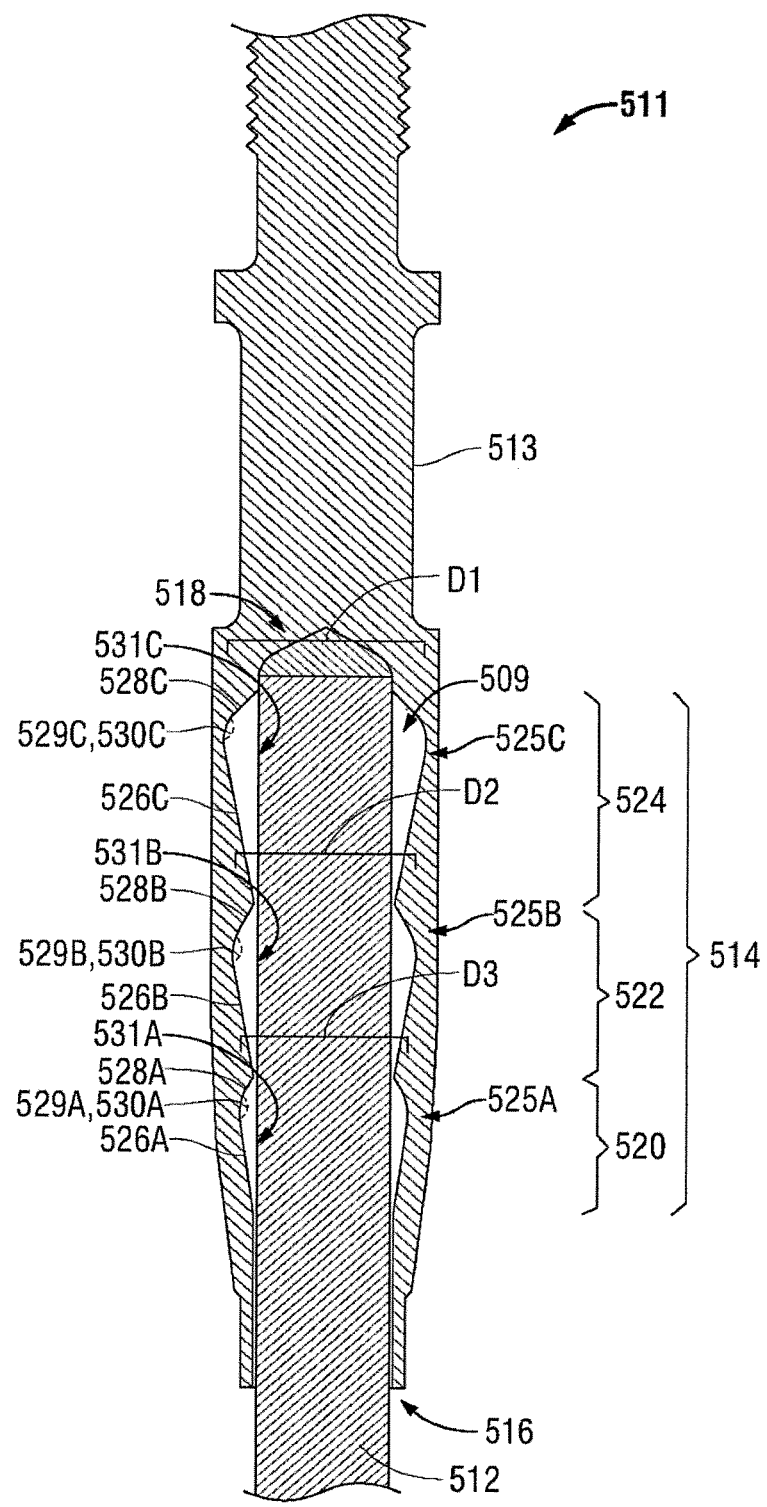
FIG. 11 depicts a diagrammatic side, cross-sectional view of an embodiment of an end fitting usable within the scope of the present disclosure engaged with a segment of a sucker rod.

FIG. 11 depicts a diagrammatic side, cross-sectional view of an embodiment of an end fitting (510) usable within the scope of the present disclosure, engaged with a segment of a fiberglass composite sucker rod (512). Except as otherwise illustrated or described here, end fitting (510) is identical to end fitting (10), which is illustrated in FIG. 1 and described in the discussion thereof. It will be understood that a sucker rod assembly (511) generally includes, in combination, an elongated fiber composite sucker rod (512), end fittings (510) joined with sucker rod (512) at the opposite ends thereof (in FIG. 11, one end fitting (510) at one of the ends of sucker rod assembly (511) is illustrated), and cured resin material (509) between sucker rod (512) and end fittings (510) for permanently joining the same. In sucker rod assembly (511), the end fittings (510) at opposite ends of sucker rod (512) can have different or identical threads, according to the manner selected for joining multiple sucker rod assemblies to form a sucker rod string (not shown in FIG. 11). Referring to FIG. 11, end fitting (510) includes body (513) having an interior, a closed end (518), and an open end (516) opposite closed end (518). Wedge system (514) is formed in the interior of body (512). Wedge system (514) includes an outer wedge portion (520), intermediate wedge portion (522) and inner wedge portion (524). It will be understood that a protruding wedge system is formed of resin material (509) and fills the cavity between sucker rod (512) and wedge system (514) for permanently joining the same during use. The protruding wedge system includes respective outer protruding wedge (525A), intermediate protruding wedge (525B) and inner protruding wedge (525C).

Referring to FIG. 11, outer wedge portion (520) is formed in the interior proximate open end (516). Viewed in cross-section as illustrated in FIG. 11, outer wedge portion (520) has a substantially triangular configuration ("outer wedge triangular configuration (525A)"). The outer wedge triangular configuration (525A) includes outer leading edge (526A) extending between open end (516) and outer trailing edge (528A). Outer leading edge (526A) intersects outer trailing edge (528A) at a respective outer vertex (529A) having respective outer vertex angle (530A). An elongated imaginary outer baseline (531A) extends opposite outer vertex (529A) between spaced, opposite ends of outer leading edge (526A) and outer trailing edge (528A). Outer wedge portion (520) has an overall length along outer baseline (531A). Intermediate wedge portion (522) is formed in the interior between inner wedge portion (524) and outer wedge portion (520).

Referring to FIG. 11, intermediate wedge portion (522) is formed in the interior intermediate open end (516) and closed end (518). Viewed in cross-section as illustrated in FIG. 11, intermediate wedge portion (522) has a respective substantially triangular configuration ("intermediate wedge triangular configuration (525B)"). The intermediate wedge triangular configuration includes respective intermediate leading edge (526B) extending between the outer wedge portion (520) and an intermediate trailing edge (528B). Intermediate leading edge (526B) intersects intermediate trailing edge (528B) at a respective intermediate vertex (529B) having respective intermediate vertex angle (523B). An elongated imaginary intermediate baseline extends opposite intermediate vertex (529B) between opposite ends of intermediate leading edge (226B) and intermediate trailing edge (528B). Intermediate wedge portion (522) has an overall length along intermediate baseline (531B).

Referring to FIG. 11, inner wedge portion (524) is formed in the interior proximate closed end (518). Referring to FIG. 11, inner wedge portion (524) is formed in the interior proximate the closed end (518). Viewed in cross-section as illustrated in FIG. 11, inner wedge portion (524) has a respective substantially triangular configuration (525C). The inner wedge triangular configuration includes inner leading edge (526C) extending between the intermediate wedge portion (522) and inner trailing edge (528C). Inner leading edge (526C) intersects inner trailing edge (528C) at a respective inner vertex (529C) having respective inner vertex angle (530C). An elongated imaginary inner baseline extends opposite inner vertex (529C) between spaced, opposite ends of inner leading edge (526C) and inner trailing edge (528C). Inner wedge portion (524) has an overall length along inner baseline (531C).

Referring to FIG. 11, outer wedge portion (520) is configured to distribute compressive force in sucker rod (512) proximate open end (516) and adjacent to outer wedge portion (520). Inner wedge portion (524) is configured to distribute compressive force in sucker rod (512) proximate the closed end (518) and adjacent to inner wedge portion (524). Intermediate wedge portion (522) is configured to distribute compressive force in sucker rod (512) adjacent intermediate wedge portion (522) and intermediate closed end (518) and open end (516). Outer wedge portion (520) has a respective outer wedge triangular configuration (525A) different from the inner wedge triangular configuration (525C) of inner wedge portion (524) for biasing distribution of compressive force in the sucker rod (512) at the end fitting (510) during use and reciprocation of the sucker rod string (not shown in FIG. 11). The outer wedge geometric configuration (525A) confines the outer wedge portion (520) to distribute less compressive force in the sucker rod (512) proximate the open end (516) than in the sucker rod (512) proximate the closed end (518). The inner wedge geometric configuration (525C) confines the inner wedge portion (524) to distribute more compressive force in the sucker rod (512) proximate the closed end (518) than in the sucker rod (512) proximate the open end (516). The intermediate wedge portion (522) has a respective intermediate wedge triangular configuration (525B) different from the inner wedge triangular configuration (525C) of inner wedge portion (524) for biasing distribution of compressive force in the sucker rod (512) at the end fitting (510) during use and reciprocation of the sucker rod string (not shown in FIG. 11). The intermediate wedge geometric configuration (525B) confines the intermediate wedge portion (522) to distribute less compressive force in the sucker rod (512) proximate the intermediate wedge portion (522) between closed end (518) and open end (516) than in the sucker rod (512) proximate the closed end (518). The intermediate wedge geometric configuration (525B) confines the intermediate wedge portion (522) to distribute more compressive force in the sucker rod (512) proximate the intermediate wedge portion (522) between closed end (518) and open end (516) than in the sucker rod (512) proximate the open end (516). Particularly in the embodiment illustrated in FIG. 11, the outer wedge portion (520) is configured relative to the inner wedge portion (524) to disproportionately reduce compressive force in the sucker rod (512) proximate the open end (516) in relation to compressive force in the sucker rod (512) proximate the closed end (518). Particularly in the embodiment illustrated in FIG. 11, the inner wedge portion (524) is configured relative to the outer wedge portion (520) to disproportionately distribute compressive force in the sucker rod (512) proximate the closed end (518) in relation to and in excess of compressive force in the sucker rod (512) proximate the open end (516). Particularly in the embodiment illustrated in FIG. 11, the outer wedge portion (520) is configured relative to the inner wedge portion (524) to reduce peak compressive force in the sucker rod (512) proximate the open end (516) in relation to and below peak compressive force in the sucker rod (512) proximate the closed end (518).

Referring to FIG. 11, in the specific arrangement illustrated inner wedge portion (524) has a respective overall length along inner baseline (531C) exceeding the overall length of intermediate wedge portion (522) along respective intermediate baseline (531B), and intermediate wedge portion (522) has a respective overall length along intermediate baseline (531B) exceeding the overall length of outer wedge portion (520) along respective outer baseline (531A). Also in the specific arrangement illustrated in FIG. 11, the length of inner leading edge (526C) of respective inner wedge portion (524) exceeds the length of intermediate leading edge (526B) of respective intermediate wedge portion (522), and the length of intermediate leading edge (526B) of intermediate wedge portion (522) exceeds the length of outer leading edge (526A) of respective outer wedge portion (520). In the specific arrangement illustrated in FIG. 11, the length of inner trailing edge (528C) of respective inner wedge portion (524) exceeds the length of intermediate trailing edge (528B) of respective intermediate wedge portion (522), and the length of intermediate trailing edge (528B) of intermediate wedge portion (522) exceeds the length of outer trailing edge (528A) of respective outer wedge portion (520). In the specific embodiment illustrated in FIG. 11, it will be understood that inner vertex angle (530C) exceeds intermediate vertex angle (530B), and intermediate vertex angle (530B) exceeds outer vertex angle (530A). In the embodiment illustrated in FIG. 11, it will be understood that inner wedge portion (524) has a respective inner wedge height determined along a tangent between inner baseline (531C) and respective inner vertex (529C); intermediate wedge portion (522) has a respective intermediate wedge height determined along a tangent between intermediate baseline (531B); and respective intermediate vertex (529B); and that outer wedge portion (520) has a respective outer wedge height determined along a tangent between outer baseline (531A) and respective outer vertex (529A). In the specific arrangement illustrated in FIG. 11, the inner wedge height of inner wedge portion (524) exceeds the intermediate wedge height of intermediate wedge portion (522), and the intermediate wedge height of intermediate wedge portion (522) exceeds the outer wedge height of outer wedge portion (520). It will be understood that the diameter of the interior of body (513) at inner vertex (529C), intermediate vertex (529B) and outer vertex (529A) varies in relation to the inner wedge height, intermediate wedge height, outer wedge height, such that the maximum diameter of the interior of body (513) relative to the central longitudinal axis of end fitting (510) exists at inner vertex (529C); diameter at inner vertex (229C) exceeds diameter at intermediate vertex (529B); and diameter at intermediate vertex (529B) exceeds diameter at outer vertex (529A).

Figure 12:
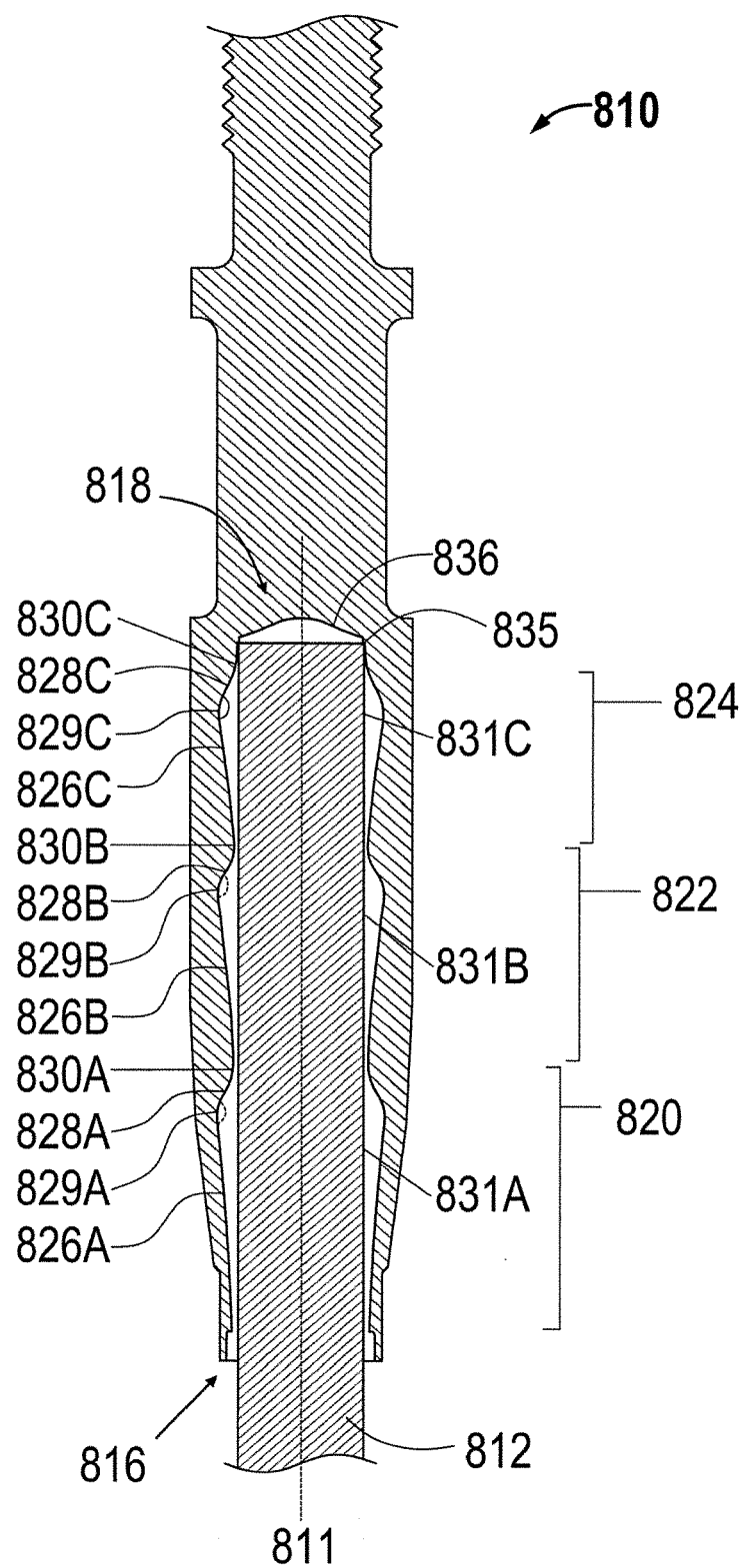
FIG. 12 depicts a diagrammatic side, cross-sectional view of an embodiment of an end fitting usable within the scope of the present disclosure engaged with a segment of a sucker rod.

FIG. 12 depicts a diagrammatic side, cross-sectional view of an embodiment of an end fitting (810) usable within the scope of the present disclosure, which is engaged with a segment of a fiberglass composite sucker rod (812). Except as otherwise illustrated in FIG. 12 or described herein, the end fitting (810) is identical to end fitting (10), which is illustrated in FIG. 1 and described in the discussion thereof. Additionally, while some structural elements are only illustrated herein on a single side of the end fitting (810), it can be appreciated that end fitting (810) is symmetrical across its longitudinal axis (811) and, thus, elements illustrated on one side can also be found on the other.

Referring to FIG. 12, as with the other embodiments, the inner surface of the end fitting (810) defines a series of leading edges (826A-C) and trailing edges (828A-C) in which the inner surface of the fitting (810) alternately diverges from, and converges towards, sucker rod (812). Each leading edge (826A-C) is defined by a divergence from the sucker rod (812) from the open end (816) to the closed end (818) of the end fitting (810), while each trailing edge (828A-C) is defined by a convergence (or approach) from the open end (816) to the closed end (818). In an embodiment, the lengths of the leading edges (826A-C), trailing edges (828A-C), or both, may decrease from the open end (816) to the closed end (818) of the end fitting (810). In the depicted embodiment, as with the embodiment depicted in FIG. 10, it can be seen that the inner surface of the end fitting (810) diverges from sucker rod (812) for a longer distance in defining the first leading edge (826A) than it does in defining the second leading edge (826B), and second leading edge (826A) is defined by a longer divergence than the third leading edge (826C).

Additionally, FIG. 12, in contrast with the embodiments shown in, e.g., FIG. 8 and FIG. 10, features gradual transitions between the diverge and convergence, which define wedge portions (820, 822, 824) having arcuate vertices (829A-C) and arcuate transition surfaces (830A-C). (Transition surfaces (830A-C) of wedge portions (820, 822, 824) may also be considered vertices or apices of the inner surface of end fitting (810), but for clarity, will be referred to as transition surfaces to maintain diagrammatic consistency of vertices (829A-C) with other depicted embodiments). Also in the specific arrangement illustrated in FIG. 12, the innermost trailing edge (828C) leads into an innermost transition surface (830C) which defines a receptacle for the sucker rod (812). Distinctly, the innermost transition surface (830C) terminates in a stop surface, which can comprise a squared-off corner (835) as depicted, which provides a resting point for the sucker rod (812) and an additional cavity (836) between the inner end of the sucker rod (812) and the closed end (818) of the end fitting (810).

In the depicted embodiment, the illustrated lengths of the specific arrangement, including outer wedge portion (820), has a respective overall length along the outer baseline (831A) that exceeds the overall length of the intermediate wedge portion (822) along its respective intermediate baseline (831B). The intermediate wedge portion (822) additionally has a respective overall length along its intermediate baseline (831B) that exceeds the overall length of the inner wedge portion (824) along respective outer baseline (831C). Also in the specific arrangement illustrated in FIG. 10, the length of the outer leading edge (826A) of respective outer wedge portion (820) exceeds the length of the intermediate leading edge (826B) of the respective intermediate wedge portion (822), and the length of the intermediate leading edge (826B) of the intermediate wedge portion (822) exceeds the length of the inner leading edge (826C) of the respective inner wedge portion (824). The same relationship is true of the outer trailing edge (828A), which is longer than the intermediate trailing edge (828B), which in turn is longer than the inner trailing edge (828C). As the leading and trailing edges lengthen, these dimensions in turn necessitate a larger angle for the arcuate vertices (829A-C) from the inner end to the outer end. The effect of these dimensions, in combination, creates a force continuum of increasing compressive pressure from the open end (816) to the closed end (818).

Figure 13:
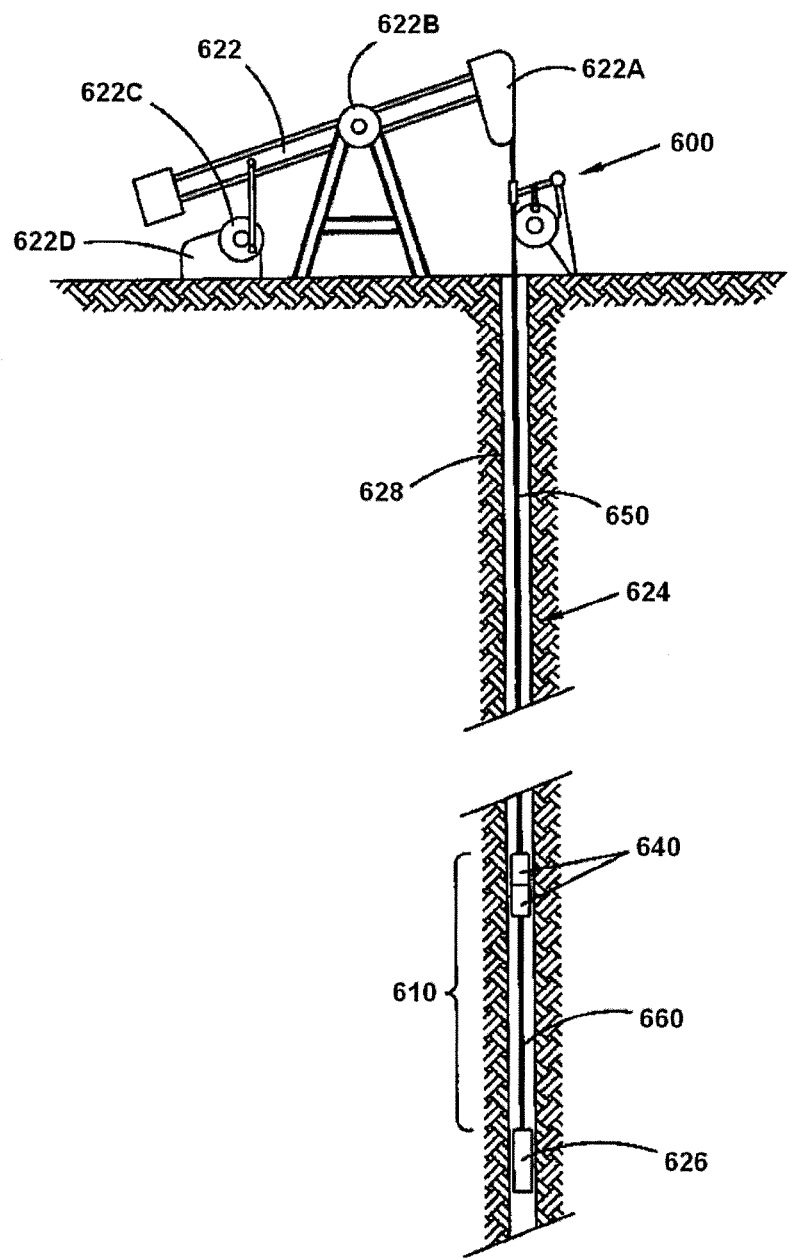
FIG. 13 is a schematic view of a pumping system usable within the scope of the present disclosure.

FIG. 13 is a schematic view of a generic pumping system 600 usable within the scope of the present disclosure. The pumping system 600 includes a pump drive 622, which can be a conventional beam pump or pump jack, at the surface and connected to a down hole pump 626 through a sucker rod 624 inserted into wellbore 628. It will be understood that the wellbore 628 is shown in a land surface, and in other embodiments the wellbore can be located in submerged, underwater terrain. Where the wellbore exists in submerged, underwater terrain, a suitable pump drive can be located, for example, at the underwater terrain surface or on a platform supported above the water. In the specific embodiment illustrated, the pump drive 622 includes a horsehead 622A, beam 622B, gearbox 622C and motor 622D. The sucker rod 624 comprises a continuous sucker rod string formed of a series of connected sucker rod segments ("sucker rods") 610 that extends from the down hole pump 26 to the pump drive 622. It will be understood that the sucker rod 624 can include any suitable combination of sucker rod segments 610 of different lengths and sizes, including in some arrangements what is loosely identified in the art as a "continuous sucker rod" or one-piece sucker rod 650 that can be many multiples of the length of conventional sucker rod segments 610 and which can be connected thereto by suitable end fittings 640. Each sucker rod segment 610 can include a fiberglass or other suitable fiber composite rod segment 660 and end fitting 640 at one or both ends thereof. It will be understood also that pumping system 600 is usable in connection with methods of artificial lift as described below.

Figure 14:
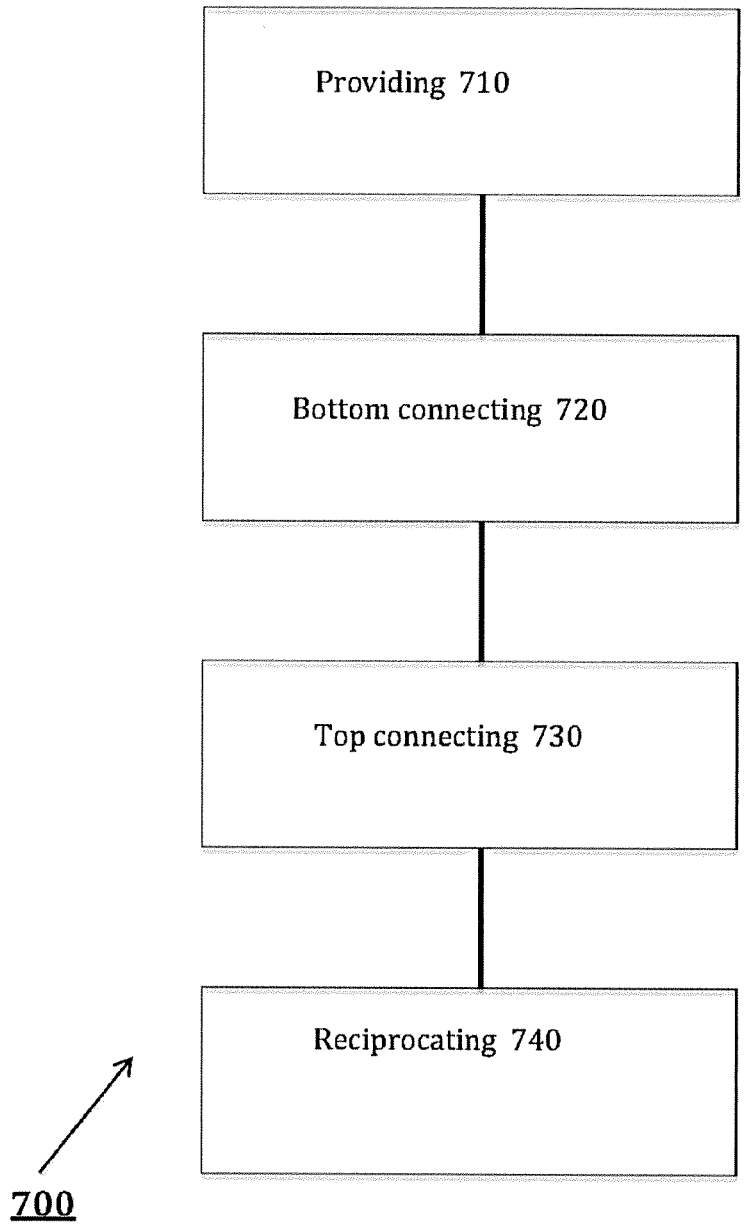
FIG. 14 is a schematic flow chart illustrating an embodiment of a method of artificial lift of liquid that is usable within the scope of the present disclosure.

FIG. 14 is a schematic flow chart illustrating an embodiment of a method of artificial lift 700 that is usable within the scope of the present disclosure. Method 700 comprises the step of providing 710 a sucker rod according to an embodiment disclosed herein. It will be understood that the sucker rod can be configured and constructed according to any of the embodiments disclosed or claimed herein. Method 700 comprises the step of bottom connecting 720 the sucker rod in driving relationship with a down hole pump positioned in a wellbore for pumping interaction with fluid to be lifted therefrom. Method 700 comprises the step of top connecting 730 the sucker rod in driven relationship with a pump drive for reciprocated lifting and lowering of the sucker rod connected thereto. Method 700 comprises the step of reciprocating 740 the sucker rod by operation of the pump drive to cause pumping motion of the down hole pump to lift fluid in the wellbore. It will be understood that methods of artificial lift as described herein provide improved energy efficiency, reduced power consumption, improved reliability, improved durability and other advantages that will be understood by those of ordinary skill.

A sucker rod string usable within the scope of the present disclosure can be manufactured and/or assembled by providing an end fitting, such as any of the embodied end fittings described above, or an end fitting having another usable configuration (e.g., any configuration of components/dimensions that will provide the closed end of the end fitting with a greater compressive force than the open end), into association with a sucker rod segment. Positioning an end of a fiber composite rod into the cavity of the end fitting creates a void between the fiber composite rod and the wedge portions of the end fitting. Thereafter, an epoxy can be injected into the void to bond with the fiber composite rod and to fixedly engage the wedge portions of the end fitting, for securing the end fitting to the fiber composite rod. This arrangement causes the stress to increase the elastic limit without permanent alteration of the fiber composite rod and epoxy combination in the cavity of the end fitting. The compressive forces on each surface resulting from reciprocation of the sucker rod string can increase toward the closed end of the end fritting and decrease toward the open end. The compressive force on each surface (e.g., the leading or trailing edge) can be proportional to the length thereof. While the present disclosure has been described with emphasis on certain embodiments, it should be understood that within the scope of the appended claims, the present systems and methods could be practiced other than as specifically described herein. Thus, additional advantages and modification will readily occur to those skilled in the art. The disclosure in its broader aspects is therefore not limited to the specific details, representative apparatus, methods, and the illustrative examples shown and described herein. Accordingly, the departures may be made from the details without departing from the spirit or scope of the disclosure.

What is claimed is:

1. An end fitting for a sucker rod comprising:
a body comprising a cavity for receiving an epoxy, the cavity comprising an interior surface, a closed end, and an open end, wherein the interior surface of said cavity comprises a plurality of leading edges, a plurality of trailing edges, and a plurality of vertices, wherein each leading edge of the plurality of leading edges diverges away from the sucker rod from the open end to the closed end, wherein each trailing edge of the plurality of trailing edges converges towards the sucker rod from the open end to the closed end, and wherein each leading edge and each trailing edge intersect at a respective vertex of the plurality of vertices,
wherein the plurality of leading edges, the plurality of trailing edges, and the plurality of vertices define a respective plurality of wedge portions, wherein a length of each leading edge of the plurality of leading edges decreases from the open end to the closed end, and wherein the length of each respective leading edge, a length of each respective trailing edge, and an angle of each respective vertex determine the compressive force applied to each respective wedge portion under load, such that the compressive force is greater proximate to the closed end than proximate to the open end.

2. The end fitting of claim 1, wherein the plurality of leading edges comprises at least three leading edges, and the plurality of trailing edges comprises at least three trailing edges.

3. The end fitting of claim 2, wherein the respective lengths of each respective leading edge decrease proportionally from the open end to the closed end, wherein the compressive force applied to each leading edge under load increases proportionally from the open end to the closed end.

4. The end fitting of claim 3, wherein the respective lengths of each respective trailing edge decrease proportionally from the open end to the closed end, wherein the compressive force applied to each trailing edge under load increases proportionally from the open end to the closed end.

5. The end fitting of claim 1, wherein the convergence of each of the plurality of trailing edges towards the sucker rod is parabolic.

6. The end fitting of claim 1, wherein the plurality of vertex angles between each respective leading edge of the plurality of leading edges and each respective trailing edge of the plurality of trailing edges increase from the open end to the closed end.

7. The end fitting of claim 6, wherein each vertex of the plurality of vertices defines an equal diameter of the cavity.

8. A method for manufacturing a sucker rod comprising the steps of:

manufacturing an end fitting comprising a cavity, an interior surface of said cavity, a closed end, and an open end, wherein the interior surface of said cavity comprises a plurality of leading edges, a plurality of trailing edges, and a plurality of vertices, wherein each of the plurality of leading edges diverge away from said sucker rod from the open end to the closed end, and wherein each of the plurality of trailing edges converge towards the sucker rod from the open end to the closed end, wherein the plurality of leading edges and the plurality of trailing edges intersect at the plurality of vertices to define a plurality of wedge portions, wherein the lengths of each leading edge of the plurality of leading edges decrease from the open end to the closed end, and wherein the length of each respective leading edge, the length of each respective trailing edge, and the angle of each respective vertex determine the compressive force applied to each respective wedge portion under load, such that the compressive force is greater proximate to the closed end than proximate to the open end;

engaging an end of a fiber composite rod into the cavity of the end fitting for creating a symmetrical void between the fiber composite rod and the interior surface of the end fitting whereby the symmetrical void has symmetry along a longitudinal axis of the fiber composite rod; and injecting an epoxy into the void to bond with the fiber composite rod and to fixedly engage the interior surface of the end fitting for securing the end fitting to the fiber composite rod, such that the epoxy is uniform in thickness between the interior surface of the cavity.

9. The method of claim 8, wherein the step of manufacturing an end fitting further comprises manufacturing a cavity comprising at least three wedge portions.

10. The method of claim 9, wherein the step of manufacturing an end fitting further comprises manufacturing the plurality of trailing edges such that the lengths of each trailing edge of the plurality of trailing edges decrease from the open end to the closed end.

11. The method of claim 8, further comprising the step of reciprocating the sucker rod and end fitting under load, wherein the resulting compressive force increases proportionally from the open end to the closed end.

12. The method of claim 8, wherein the step of injecting an epoxy into the void further comprises increasing the elastic limit without permanent alteration of the fiber composite rod.

13. An end fitting for a sucker rod comprising:
a body comprising a cavity for receiving an epoxy, the cavity comprising an interior surface, a closed end, and an open end, wherein the interior surface of said cavity comprises a plurality of leading edges, a plurality of trailing edges, and a plurality of vertices therebetween, wherein each of the plurality of leading edges diverge away from the sucker rod from the open end to the closed end, wherein each of the plurality of trailing edges converge towards the sucker rod from the open end to the closed end,
wherein a respective length of the respective plurality of leading edges decreases from the open end to the closed end, and wherein a respective length of the respective plurality of trailing edges increases from the open end to the closed end.

14. The end fitting of claim 13, wherein each vertex of the plurality of vertices defines a respective diameter of the cavity, wherein each diameter of the plurality of diameters increases from the open end to the closed end.

15. The end fitting of claim 13, wherein the compressive force of the end fitting under load is greater proximate to the closed end than proximate to the open end.

* * * * *